United States Patent
Reznik et al.

(10) Patent No.: US 10,880,349 B2
(45) Date of Patent: *Dec. 29, 2020

(54) QUALITY-DRIVEN STREAMING

(71) Applicant: VID SCALE, INC., Wilmington, DE (US)

(72) Inventors: Yuriy Reznik, Seattle, WA (US);
Eduardo Asbun, Santa Clara, CA (US);
Zhifeng Chen, San Diego, CA (US);
Rahul Vanam, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 103 days.

This patent is subject to a terminal disclaimer.

(21) Appl. No.: 16/189,649

(22) Filed: Nov. 13, 2018

(65) Prior Publication Data

US 2019/0081998 A1 Mar. 14, 2019

Related U.S. Application Data

(63) Continuation of application No. 13/938,539, filed on Jul. 10, 2013, now Pat. No. 10,178,140.

(Continued)

(51) Int. Cl.
*H04L 29/06* (2006.01)

(52) U.S. Cl.
CPC .......... *H04L 65/60* (2013.01); *H04L 65/4084* (2013.01); *H04L 65/602* (2013.01); *H04L 65/80* (2013.01)

(58) Field of Classification Search
CPC . H04L 65/4084; H04L 65/4092; H04L 65/60; H04L 65/602; H04L 65/604;

(Continued)

(56) References Cited

U.S. PATENT DOCUMENTS 8,396,114 B2 3/2013 Gu et al.
8,621,044 B2 * 12/2013 Sood .................. H04L 65/4092
709/217

(Continued)

FOREIGN PATENT DOCUMENTS

CN 102067610 A 5/2011
CN 102136948 A 7/2011

(Continued)

OTHER PUBLICATIONS

"HTTP Dynamic Streaming on the Adobe Flash Platform", Adobe, Adobe Flash Platform Technical White Paper, 2011, 18 pages.

(Continued)

*Primary Examiner* — Lance Leonard Barry
(74) *Attorney, Agent, or Firm* — Condo Roccia Koptiw LLP

(57) ABSTRACT

Quality-based optimizations of a delivery process of streaming content may be enabled. The optimization may take the form of quality-based switching. To enable quality-based switching in a streaming client, the client may have access to information about the quality of an encoded segment and/or sub-segment. Quality-related information may include any number of added quality metrics relating to an encoded segment and/or sub-segment of an encoded video stream. The addition of quality-related information may be accomplished by including the quality-related information in a manifest file, including the quality-related information in segment indices stored in a segment index file, and/or providing additional files with quality-related segment information and providing a link to the information from an MPD file. Upon receiving the quality-related information, the client may request and receive a stream that has a lower bitrate, thereby saving bandwidth while retaining quality of the streaming content.

20 Claims, 22 Drawing Sheets

Related U.S. Application Data

(60) Provisional application No. 61/669,983, filed on Jul. 10, 2012, provisional application No. 61/835,105, filed on Jun. 14, 2013.

(58) Field of Classification Search
CPC .............. H04L 65/80; H04N 21/26258; H04N 21/23439; H04N 21/2401; H04N 21/2402; H04N 21/6181; H04N 21/6131; H04N 21/8456
See application file for complete search history.

(56) References Cited

U.S. PATENT DOCUMENTS

| | | | |
|---|---|---|---|
| 8,891,619 B2 | 11/2014 | Leontaris et al. | |
| 9,160,779 B2* | 10/2015 | Cherian | H04L 65/605 |
| 10,178,140 B2* | 1/2019 | Reznik | H04L 65/60 |
| 10,397,294 B2* | 8/2019 | Mueller | H04L 47/10 |
| 2002/0170068 A1 | 11/2002 | Rafey et al. | |
| 2007/0022215 A1 | 1/2007 | Singer et al. | |
| 2007/0195878 A1 | 8/2007 | Bruls et al. | |
| 2010/0017686 A1 | 1/2010 | Luby et al. | |
| 2010/0021001 A1* | 1/2010 | Honsinger | G06T 1/0028 382/100 |
| 2010/0235472 A1 | 9/2010 | Sood et al. | |
| 2011/0082914 A1* | 4/2011 | Robert | H04N 21/4788 709/219 |
| 2011/0082945 A1 | 4/2011 | Myers et al. | |
| 2011/0093617 A1 | 4/2011 | Igarashi | |
| 2011/0176496 A1 | 7/2011 | Roy et al. | |
| 2012/0023254 A1 | 1/2012 | Park et al. | |
| 2012/0128334 A1* | 5/2012 | Cheok | H04N 21/2665 386/278 |
| 2012/0209952 A1* | 8/2012 | Lotfallah | H04L 65/4084 709/217 |
| 2012/0233345 A1* | 9/2012 | Hannuksela | H04N 21/26258 709/231 |
| 2013/0007814 A1* | 1/2013 | Cherian | H04L 65/605 725/62 |
| 2013/0057705 A1* | 3/2013 | Parker | H04N 17/004 348/184 |
| 2013/0124749 A1* | 5/2013 | Thang | H04L 65/4092 709/231 |
| 2013/0290493 A1* | 10/2013 | Oyman | H04W 72/0413 709/219 |
| 2013/0291040 A1* | 10/2013 | Rhyu | H04N 21/4622 725/109 |
| 2014/0019593 A1 | 1/2014 | Reznik et al. | |
| 2014/0219088 A1* | 8/2014 | Oyman | H04N 21/23439 370/231 |

FOREIGN PATENT DOCUMENTS

| | | |
|---|---|---|
| CN | 102301710 A | 12/2011 |
| CN | 102356605 A | 2/2012 |
| CN | 102710586 A | 10/2012 |
| EP | 1868347 A2 | 12/2007 |
| JP | 2007-194680 A | 8/2007 |
| JP | 2009-503950 A | 1/2009 |
| JP | 2011-087103 A | 4/2011 |
| JP | 2014-513449 A | 5/2014 |
| RU | 2398362 C2 | 8/2010 |
| TW | 2010-14366 A | 4/2010 |
| WO | WO 2008/077119 A2 | 6/2008 |
| WO | WO 2009/024031 A1 | 2/2009 |
| WO | WO 2010/107625 A2 | 9/2010 |
| WO | WO 2010/107625 A3 | 1/2011 |
| WO | WO 2011/047335 A1 | 4/2011 |
| WO | WO 2012/093718 A1 | 7/2012 |
| WO | WO 2012/109520 A1 | 8/2012 |

OTHER PUBLICATIONS

"Information Technology—Coding of Audio-Visual Objects—Part 12: ISO Base Media File Format, Amendment 3: Dash Support and RTP Reception Hint Track Processing", ISO/IEC 14496-12:2008/ FDAM 3:2011E, Aug. 17, 2011, 44 pages.

"Information Technology—Coding of Audio-Visual Objects—Part 12: ISO Base Media File Format", ISO/IEC 14496-12:2012, 2012, 182 pages.

"Information Technology—Dynamic Adaptive Streaming Over HTTP DASH—Part 1: Media Presentation Description and Segment Formats", ISO/IEC 23009-1:2012, Apr. 1, 2012, 134 pages.

3rd Generation Partnership Project3GPP, TS 26.234 V9.3.0, "Technical Specification Group Services and System Aspects, Transparent end-to-end Packet-switched Streaming Service PSS, Protocols and codecs Release 9", Jun. 2010, 1-182.

3rd Generation Partnership Project3GPP, TS 26.234 V9.6.0, "Technical Specification Group Services and System Aspects, Transparent End-to-End Packet-Switched, Streaming Service PSS, Protocols and Codecs Release 9", Mar. 2011, 1-189.

3rd Generation Partnership Project3GPP, TS 26.247 V10.0.0, "Technical Specification Group Services and System Aspects, Transparent End-to-End Packet-Switched Streaming Service PSS, Progressive Download and Dynamic Adaptive Streaming Over HTTP 3GP-DASH Release 10", Jun. 2011, 1-94.

Conklin et al., "Video Coding for Streaming Media Delivery on the Internet", IEEE Transactions on Circuits and Systems for Video Technology, vol. 11, No. 3, Mar. 2001, 269-281.

Crabtree et al., "Fiel trial of Quality Driven Video Streaming", IEEE Consumer Communications and Networking Conference CCNC, Las Vegas, Nevada, USA, Jan. 14-17, 2012, pp. 554-558.

European Telecommunications Standards Institute ETSI, TS 126 234 V9.3.0, "Universal Mobile Telecommunications System UMTS, LTE, Transparent End-to-End Packet-Switched Streaming Service PSS, Protocols and codecs", Jun. 2010, pp. 1-184.

Nilsson M., "Quality-Driven Adaptive Video Streaming", Mobile Video Optimizations, Brussels, Jun. 12-13, 2012.

Oipf, Open IPTV Forum, "Release 2 Specification vol. 2a—HTTP Adaptive Streaming V2.1", Jun. 21, 2011, 1-25.

Pantos R. "HTTP Live Streaming", Apple Inc., Internet-Draft, Mar. 31, 2011, 1-25.

Stockhammer Thomas, "Dynamic Adaptive Streaming over HTTP-Design Priciples and Standards", Qualcomm Incorporated, In: MMSys '11: Proceedings of the Second Annual ACM Conference on Multimedia Systems New York, NY, USA: ACM Press, Feb. 2011, 133-144.

Thang et al., "Adaptive Streaming of Audiovisual Content using MPEG DASH", IEEE Transactions on Consumer Electronics, vol. 58, No. 1, Feb. 2012, 8 pages.

Zambelli Alex, "IIS Smooth Streaming Technical Overview", Windows Server, Microsoft Corporation, Mar. 2009, 1-17.

* cited by examiner

QUALITY-DRIVEN STREAMING

CROSS-REFERENCE TO RELATED APPLICATIONS

This application is a continuation application of U.S. Non-Provisional application Ser. No. 13/938,539, filed Jul. 10, 2013, which claims the benefit of U.S. Provisional Patent Application No. 61/669,983, filed Jul. 10, 2012, and U.S. Provisional Patent Application No. 61/835,105, filed Jun. 14, 2013, the contents of which are hereby incorporated by reference herein.

BACKGROUND

The MPEG/3GPP Dynamic Adaptive HTTP Streaming (DASH) standard may define a framework for design of bandwidth-adaptive delivery of streaming content over wireless and wired networks. The MPEG/3GPP DASH standard, however, may not provide a mechanism for sensing and adapting to complexity and quality of the encoded video content. This may introduce certain inefficiencies in the use of network bandwidth resources and may lead to a suboptimal user experience.

SUMMARY

Systems, methods, and instrumentalities are disclosed to enable quality-based optimizations of the delivery process of streaming content. The optimization may take the form of quality-based (e.g., which may also be referred to as quality-driven or quality-aware or the like) switching. Quality-based switching may be enabled in the framework of adaptive HTTP-based streaming. If a client has information relating to the quality of each of the encoded segments it receives, then the client may enable quality-based switching. There may be various ways by which information about segment quality may be communicated to a client. Such communication may enable quality-based adaptation in the client.

To enable quality-based decisions in a streaming client, the client may have access to information about the quality of each encoded segment. Quality-related information may include one or more quality metrics relating to an encoded segment and/or encoded sub-segment. The addition of quality-related information may be accomplished by including the quality-related information in a manifest file (e.g., .mdp file). For example, the quality-related information may be included in segment indices stored in a segment index file (e.g., MP4 or M4S files) and/or additional files with quality-related segment information may be provided, for example, by providing a link to the information from the manifest file. Upon receiving the quality-related information, the client may request and/or receive a stream that has a lower bitrate, thereby saving bandwidth while retaining quality of the streaming content. For example, the client may request and/or receive a lower bitrate stream that has a quality that is acceptable to the client for the stream.

A method of content switching in a wireless transmit/receive unit (WTRU) may involve receiving quality information relating to a content segment that is encoded as a plurality of streams. The content segment may form a portion of a content period. A stream of the content segment may be selected as a function of respective bitrates and quality information associated with the streams. The selected stream may be requested and/or received by the WTRU.

A method of content switching in a wireless transmit/receive unit (WTRU) may involve receiving quality information relating to a content segment that is encoded as a plurality of streams. The content sub-segment may form a portion of a content segment that may form a portion of a content period. A stream of the content segment may be selected as a function of respective bitrates and quality information associated with the streams. The selected stream may be requested and/or received by the WTRU.

A method of quality-driven switching in a wireless transmit/receive unit (WTRU), the method may involve receiving a first stream of content at a first bitrate. The first stream of content may have at least a threshold level of quality. Quality information relating to a segment of a period of the first stream of content may be received. A second stream of content at a second bitrate may be determined based on the received quality information. The second bitrate may be lower than the first bitrate, and the second stream of content may have at least the threshold level of quality. The second stream of content may be requested and/or received at the second bitrate.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
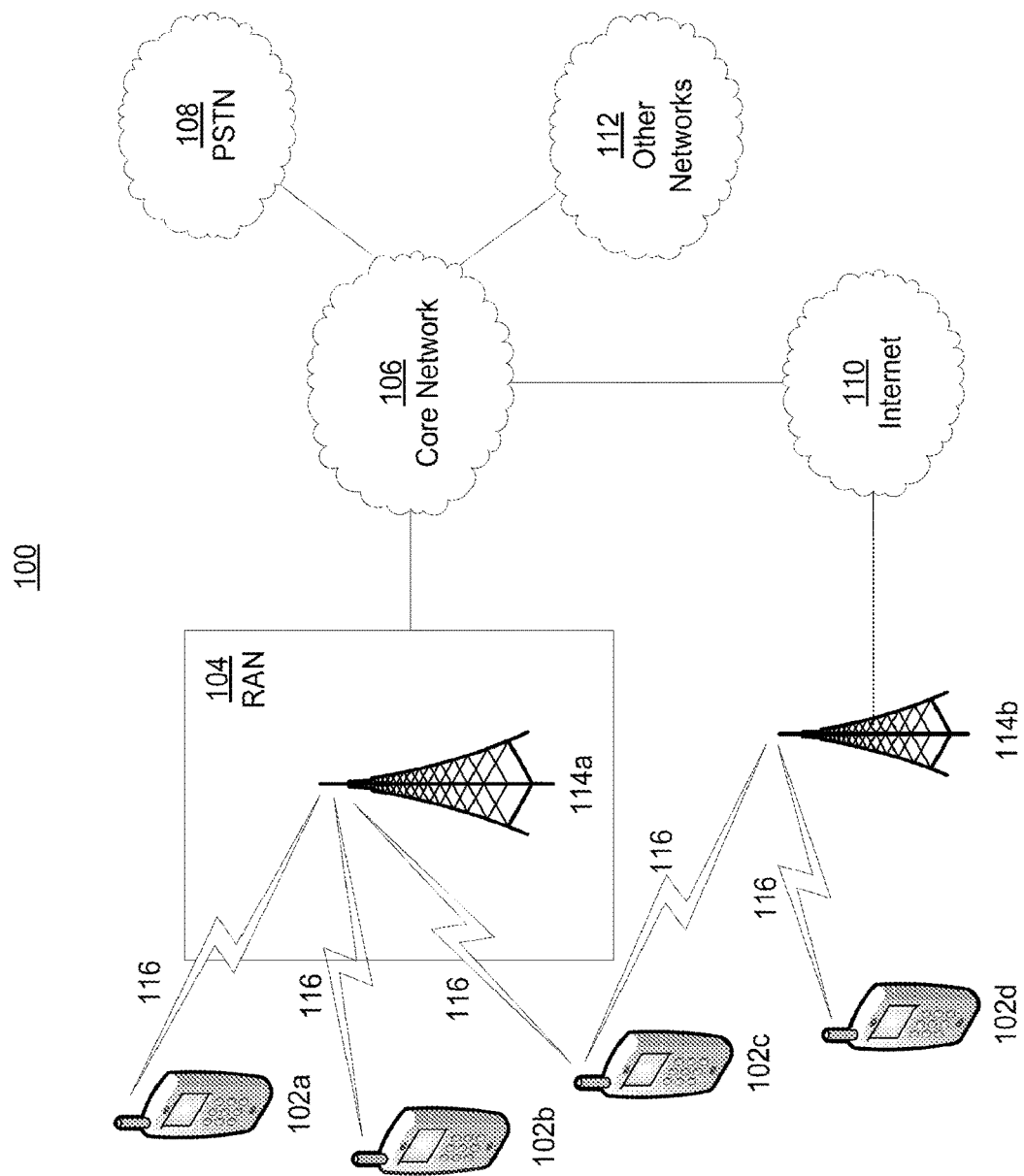
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
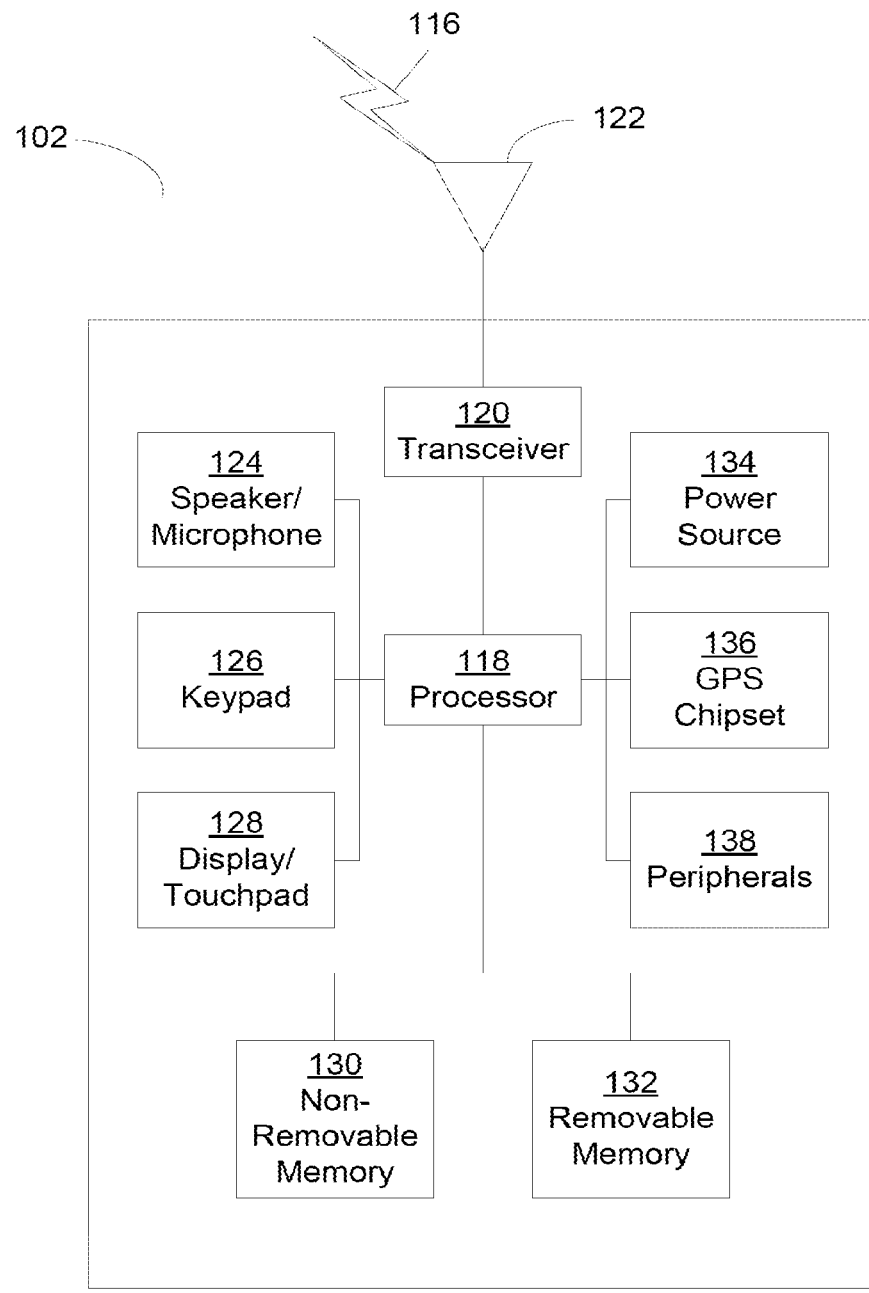
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
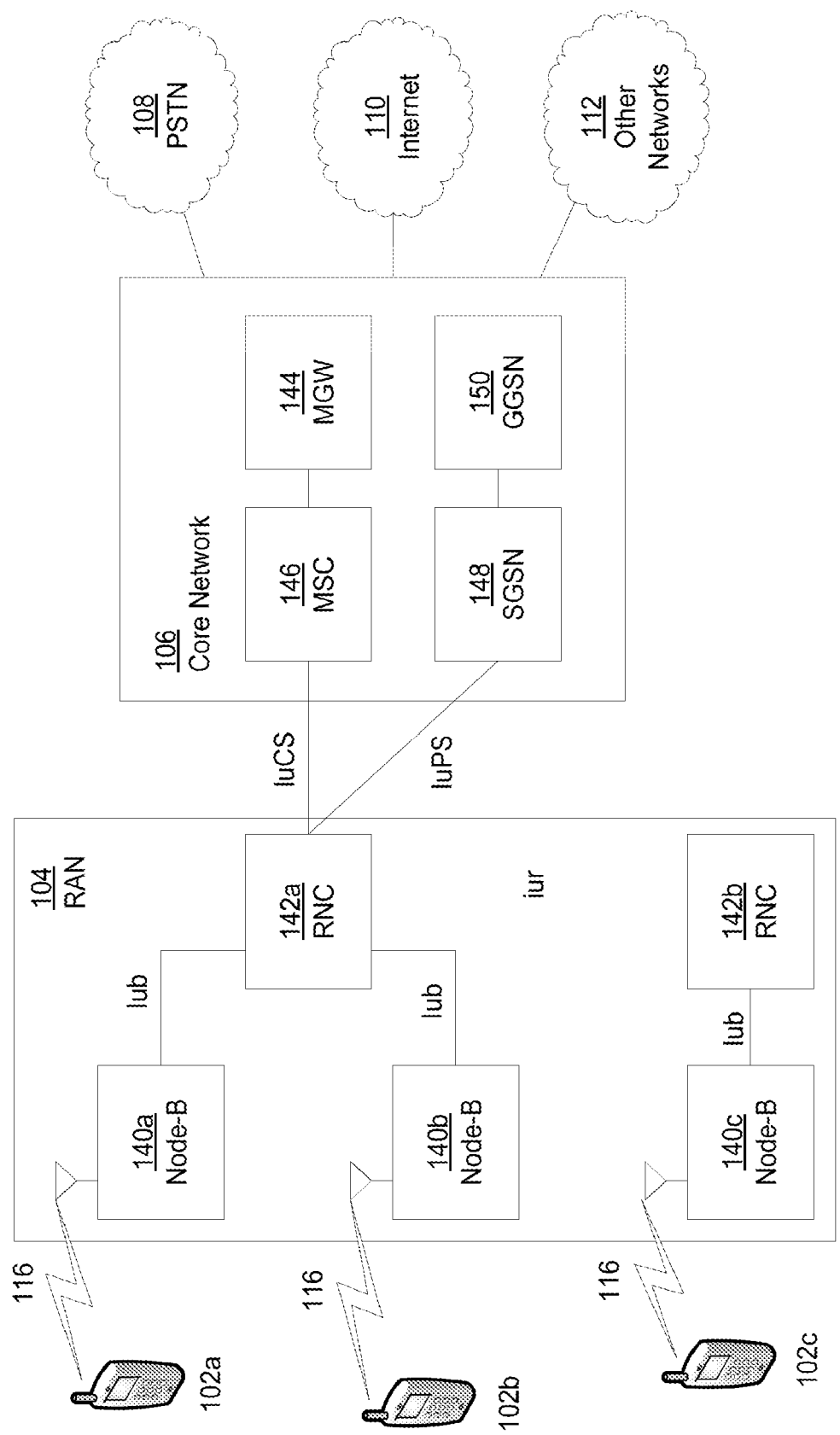
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
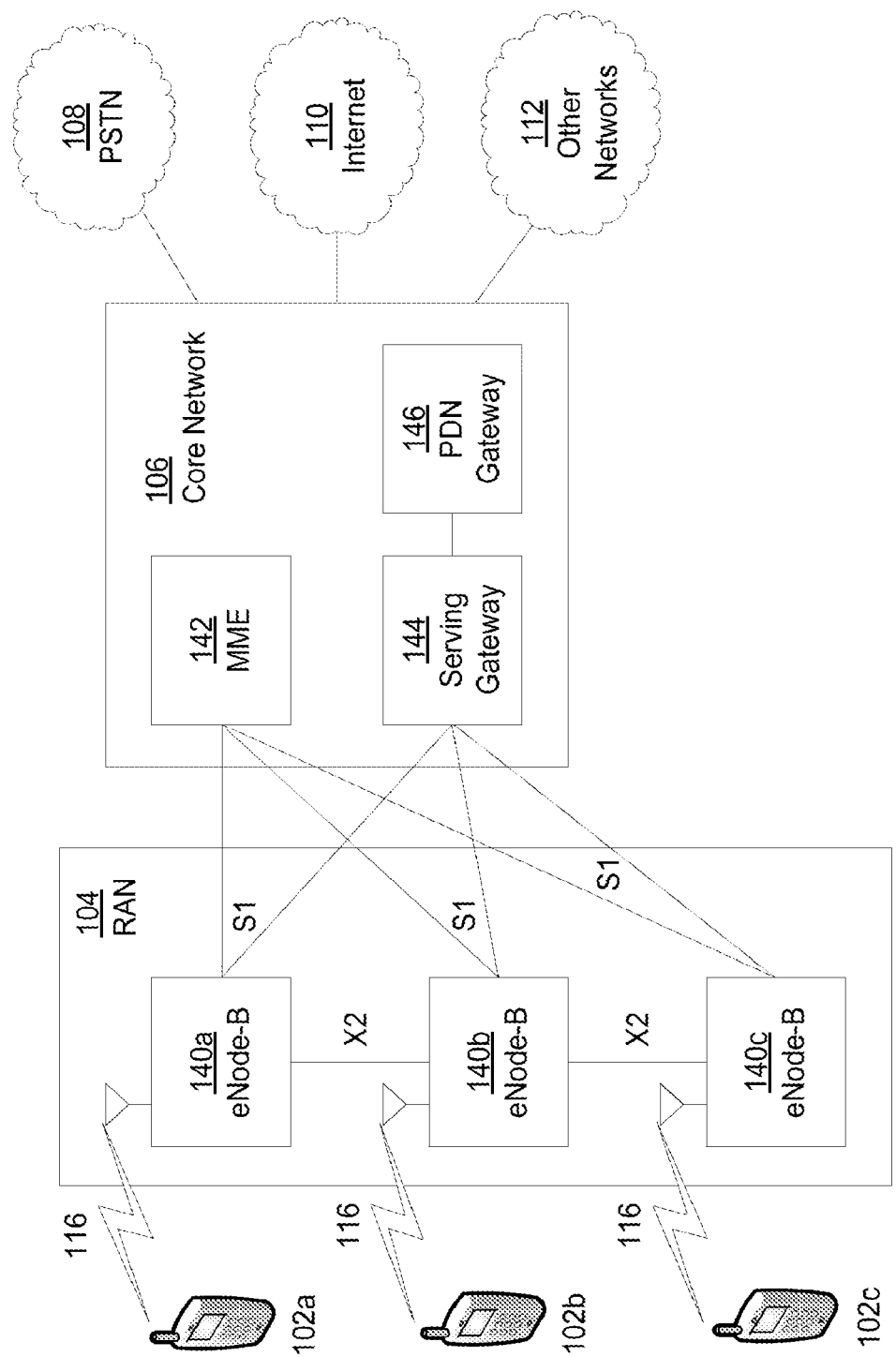
FIG. 1D is a system diagram of an example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
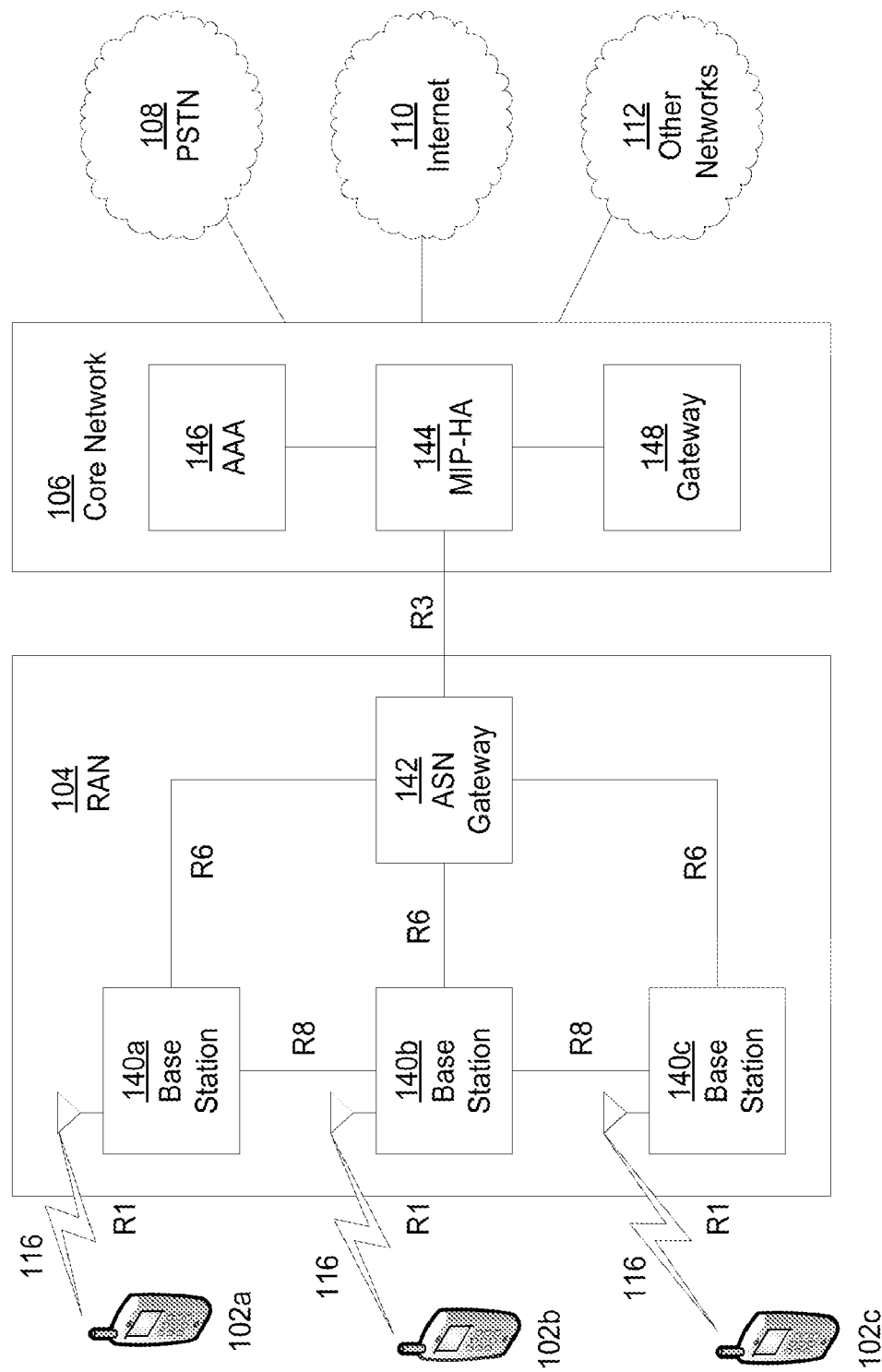
FIG. 1E is a system diagram of an example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The techniques discussed herein may be performed partially or wholly by a WTRU 102a, 102b, 102c, 102d, a RAN 104, a core network 106, the Internet 110, and/or other networks 112. For example, video streaming being performed by a WTRU 102a, 102b, 102c, 102d may engage various processing as discussed herein.

Systems, methods, and instrumentalities are disclosed to enable quality-based optimizations of video delivery. The disclosed techniques may be illustrated with reference to the MPEG/3GPP DASH standard, but are not limited thereto. For example, ways by which information about segment quality may be communicated to a DASH client may be described herein. Such communication may enable quality-based adaptation in the client. The techniques described herein may be implemented as extensions to the MPEG-DASH standard.

The effectiveness of image compression may be assessed, for example, using bitrate and/or bandwidth to transmit the signal, and/or the quality of the reconstructed image. If time and/or the sequence of images/frames or video are considered, then there may be a plurality of bitrate and/or quality characteristics that may be achieved by video codecs for each frame.

To report rate and/or quality parameters (e.g., PSNR, SSIM, and/or MOS) for a sequence, the average values of bitrates and/or quality parameters across one or more of the frames may be used. Average values may not be reliable, for example, as there may be different ways to achieve the same average scores, which, for example, may have a different impact on the overall quality of the experience. For example, encoders may use different strategies for balancing instantaneous tradeoffs between quality and rate for individual frames in a video sequence. The bitrate may be maintained as close as possible to a given target, while achieving the best possible picture/frame quality given this rate. This strategy may be referred to as constant bitrate (CBR) encoding. Quality may be maintained close to a given target, while using the minimum possible number of bits needed to achieve such quality for each frame. This strategy may be referred to as constant quality encoding.

In order to accommodate changing complexity of video content, encoders may implement versions of constant rate and/or constant quality encoding in which the encoders allow rate and/or quality to fluctuate from frame to frame. For example, the encoders may try to reduce or minimize such fluctuations. Such encoding strategies may be referred to as bitrate-based and quality-based encoding, respectively.

Figure 2:
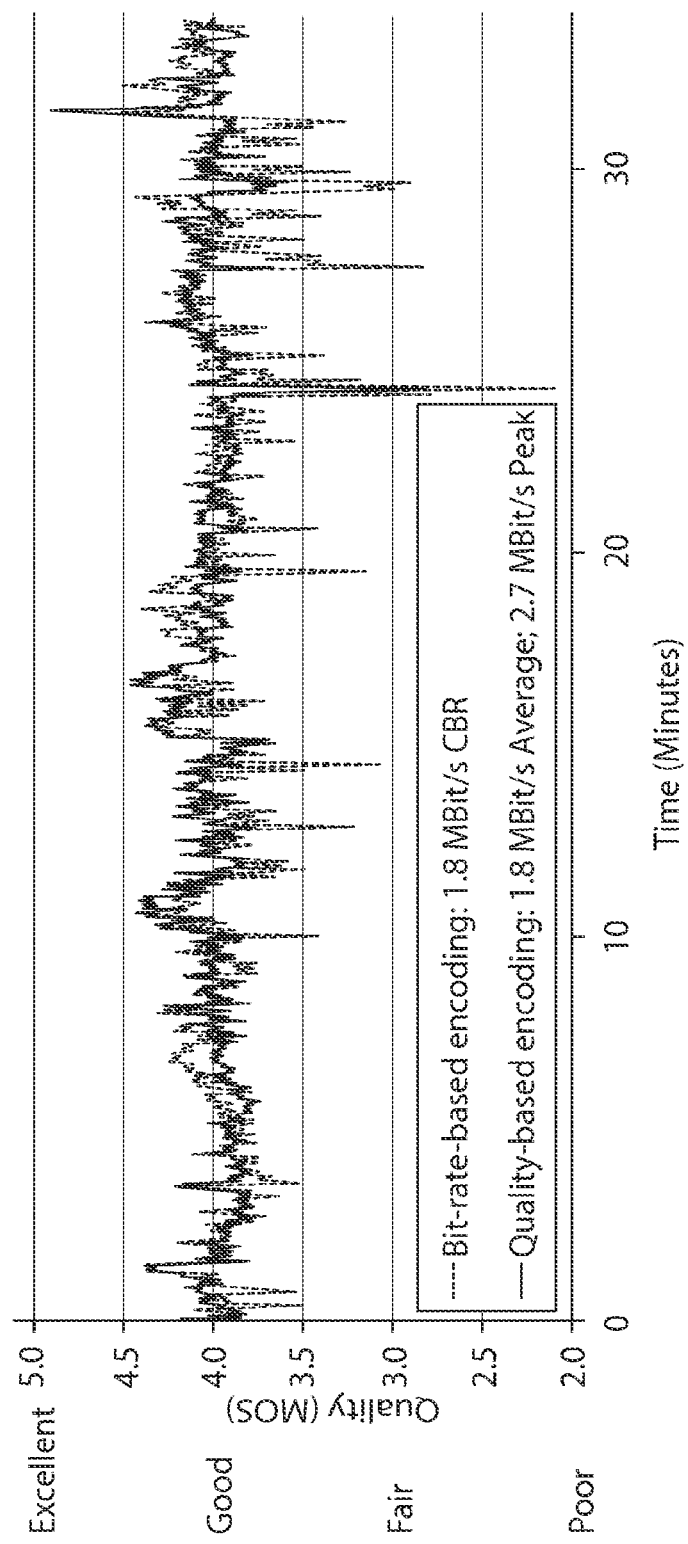
FIG. 2 is a graph illustrating an example of MOS fluctuations with bitrate-based encoding and quality-based encoding.

FIG. 2 is a graph illustrating an example of MOS fluctuations with bitrate-based encoding and quality-based encoding of the same sequence. FIG. 2 illustrates an example of MOS scores produced by bitrate-based encoding and quality-based encoding of a video sequence. In this example, quality-based encoding may utilize a higher peak bitrate (2.7 Mbps), but may achieve roughly the same average bitrate (1.8 Mbps) as the bitrate-based encoding. Quality-based encoding may be characterized by more consistent quality. Quality-based encoding may have fewer instances of frames/segments where the quality drops below a certain acceptability level (e.g., fair).

Figure 3:
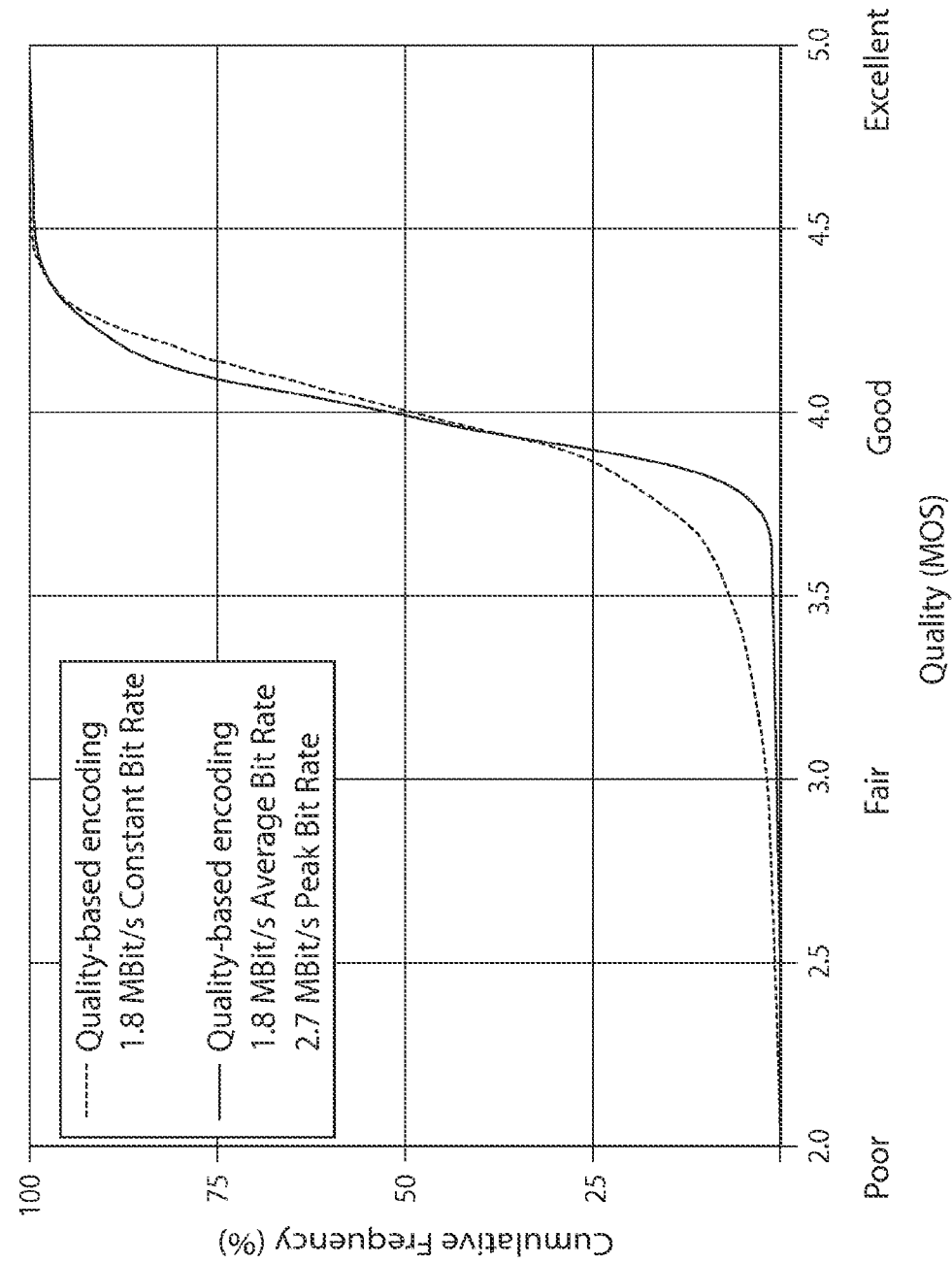
FIG. 3 is a graph illustrating example distributions of MOS scores for bitrate-based encoding and quality-based encoding.

FIG. 3 is an example of distributions of MOS scores for bitrate-based encoding and quality-based encoding. The lack of quality drops below acceptable level may lead to a better overall quality of experience. This may be the case for a variety of different types of visual content and reproduction settings.

Figure 4:
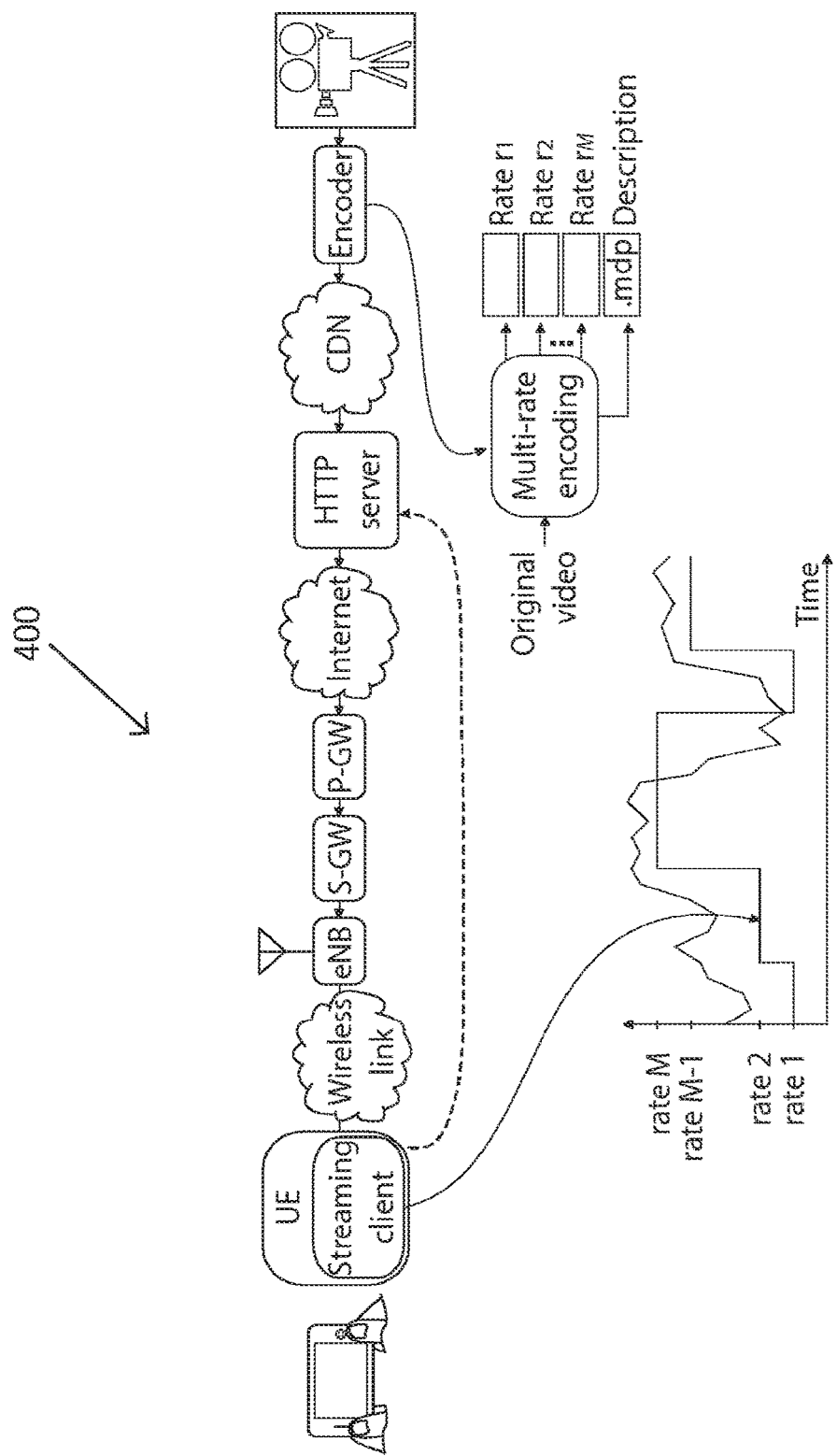
FIG. 4 is a diagram illustrating an example of the architecture of an adaptive HTTP-based streaming system.

FIG. 4 is a diagram illustrating an example of an operation of an adaptive HTTP-based streaming system 400. Streaming systems may employ rate-based encodings of video, for example, by preparing multiple streams encoded at different target rates. A client application may be used to dynamically select between one or more encoded streams. Stream switches implemented by a client may have a certain granularity, which, for example, may be around 2-10 seconds in practice. The points at which a client may switch between encoded streams may be referred to as switch points. The portions of the encoded content between the encoded streams may be referred to as segments.

During a streaming session, a streaming client may compute the rate of delivery of one or more segments. The rate of delivery of a segment may give the client an estimate of the bandwidth of the network that may be available for receiving the next segment. Based on this estimate, the client may decide which next encoding/rate to use for the next segment. This may allow the client to adapt to changing network conditions. For example, high-level information about each encoded stream, including but not limited to their rates, may be stored in a manifest file or a multimedia presentation description (MPD) file. For example, offsets and timing information for an encoded segment within a stream may be stored in one or more Segment Index files.

Manifest files and/or index files may not include information about the quality of each of the encoded segments. The streaming client may not have knowledge about quality of each segment. Without this knowledge, the streaming client may not be able to implement quality-driven adaptation. This may create certain inefficiencies in the streaming delivery system. For example, there may be situations where the content is difficult to encode, which may result in fair quality at the current rate. For example, there may be situations when content is easy to encode, and where it makes sense to lower the rate without an effect on quality. One example of this is illustrated in FIG. 5.

Figure 5:
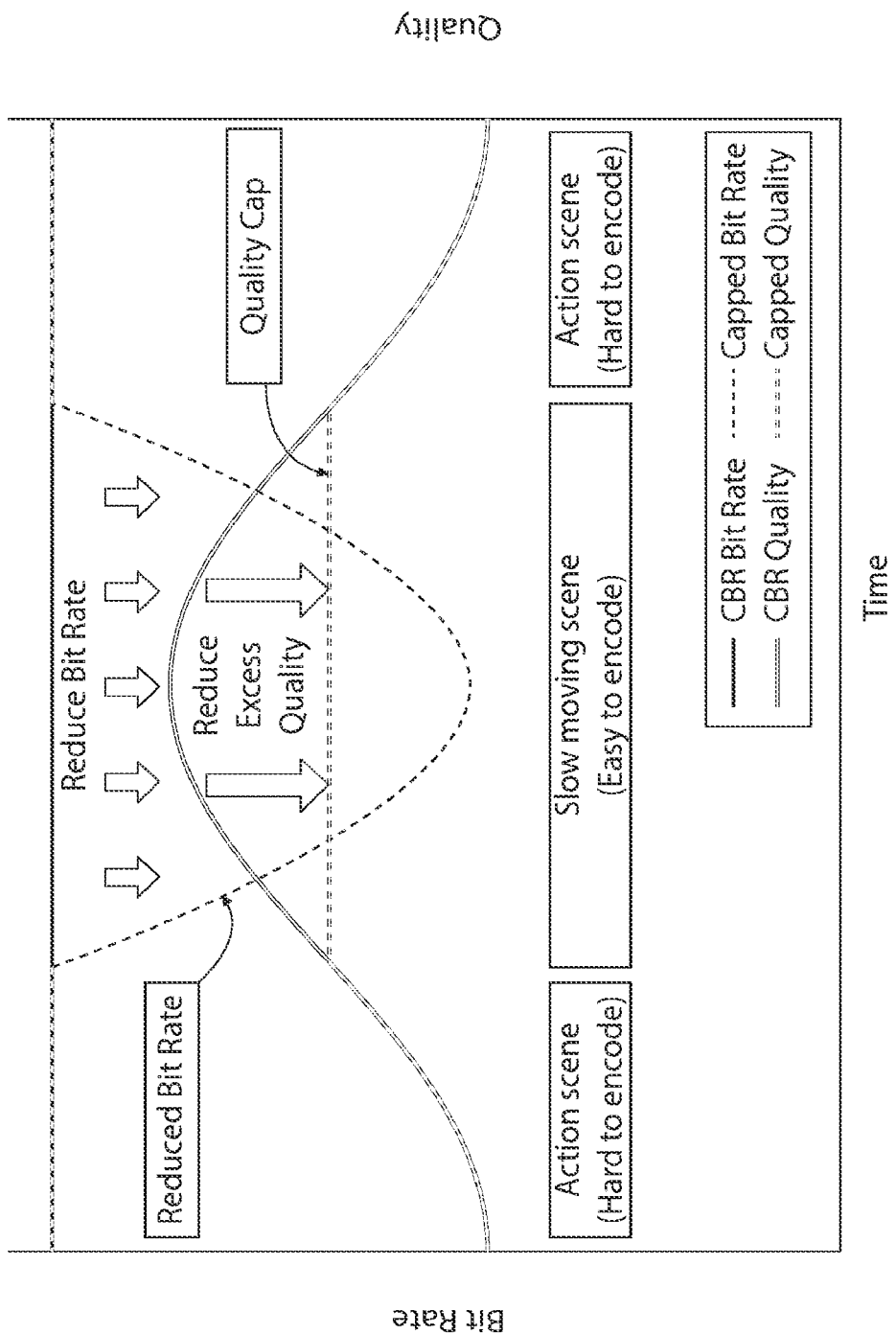
FIG. 5 is a diagram illustrating an example of the potential for reducing bitrate by using quality-based adaptation.

FIG. 5 is a diagram illustrating an example of the potential for reducing bitrate by using quality-based adaptation. As shown in FIG. 5, a video may comprise one or more segments that may be easy to encode. In such instances, switching to a lower rate may save bandwidth while retaining quality at a certain cap level. How such quality-aware (e.g., quality-driven) switching may be enabled in the framework of adaptive HTTP-based streaming, and specifically the MPEG/3GPP DASH standard, may be described herein.

A streaming client may impose some quality cap, for example, as shown in FIG. 5. The client may know one or more quality values (e.g., PSNR) achieved for a segment. The client may select an encoding at a lower rate that is sufficient to reach a given quality target, for example, if the client determines that a next segment achieves the one or more quality values that are equal to or greater than the given quality target (e.g., 48 dB instead of target 38 dB). The client may save bandwidth and/or may improve consistency of quality of visual content that is being delivered.

Figure 6:
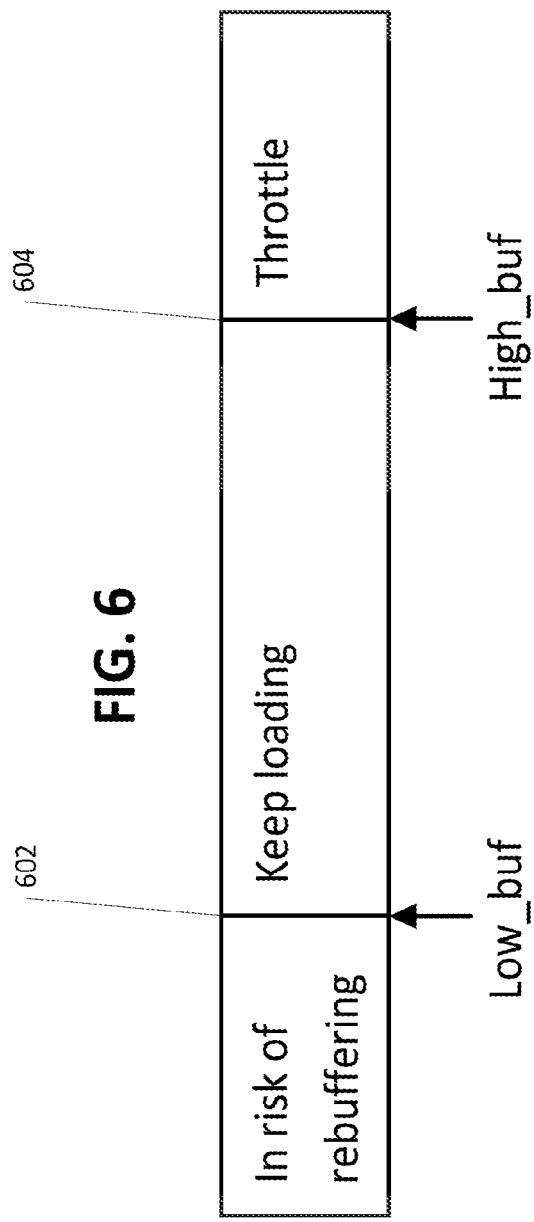
FIG. 6 is a diagram illustrating an example of a client buffer fullness states.

Quality information may be used by a DASH streaming client to improve video delivery. A client buffer model may be described. FIG. 6 is a diagram illustrating an example of a number of client buffer fullness states. A client may operate with a pre-roll buffer of a certain length (e.g., 10-30 sec). The client may utilize one or more buffer fullness thresholds, such as Low_buf 602 and High_buf 604, for example. Low_buf 602 may refer to a threshold in which the client may be in a risk of running into a rebuffering situation. When at the Low_buf threshold 602, the client may perform measurements to replenish the buffer. High_buf 604 may refer to a threshold in which the client may have accumulated an amount of information to consider switching up and/or throttling (e.g., if highest rate is already reached).

Figure 7:
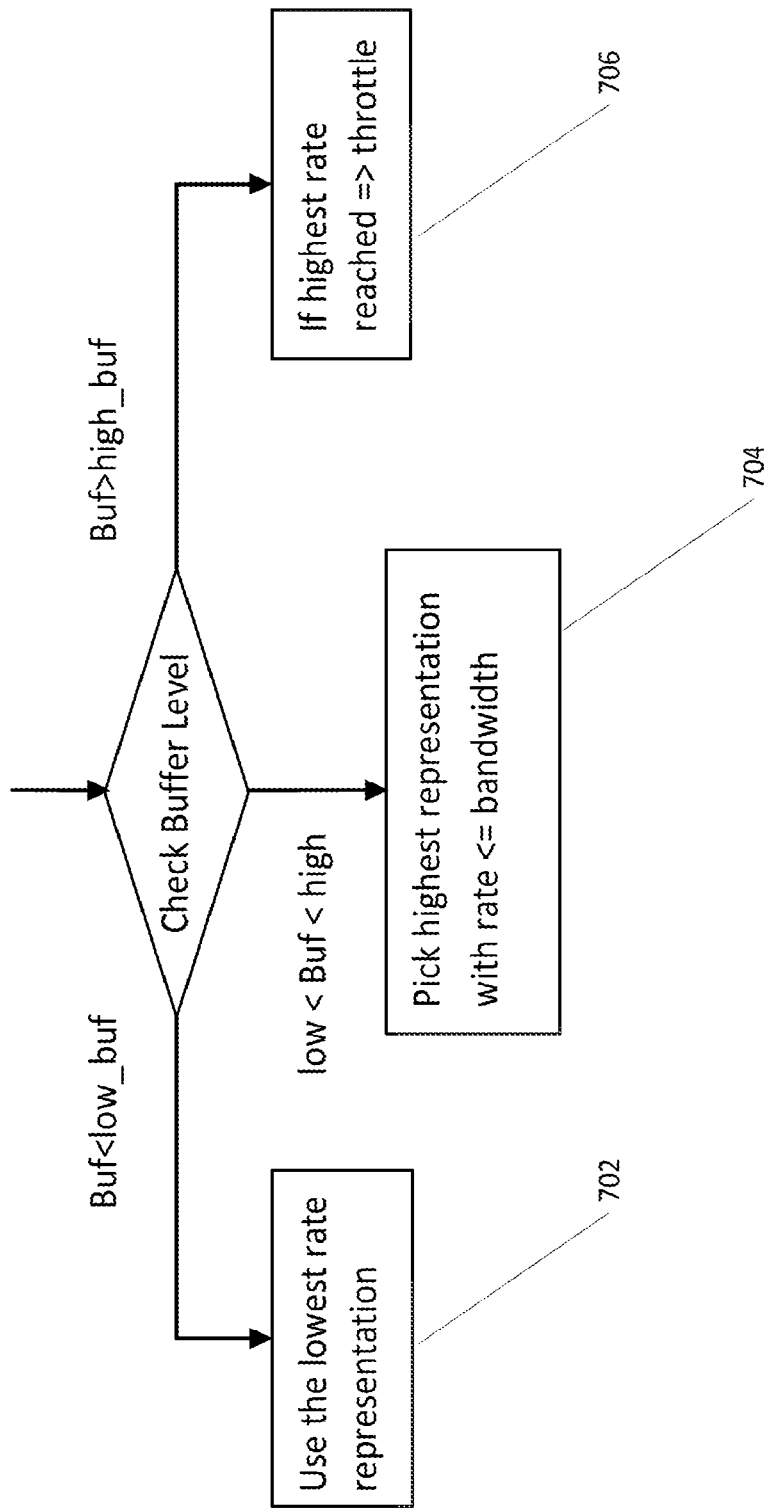
FIG. 7 is a diagram illustrating a model representation of an operation of a DASH streaming client when quality information is not provided.

FIG. 7 is a diagram illustrating a model representation 700 of an operation of a DASH streaming client when quality information is not provided. A DASH client operation model may be described. Referring to FIG. 7, as shown at 702, when a buffer level Buf is less than the low_buf threshold, the client may select the lowest rate representation to avoid rebuffering. As shown at 704, when the buffer level Buf is between the low_buf and high_buf thresholds, the client may, for example, select the highest rate representation that is lower than the available bandwidth. As shown at 706, when the buffer level Buf is greater than the buf_high threshold, the client may check if the highest rate representation was reached, and if so, then the client may introduce one or more pauses between segment loads (e.g., throttling) as it may already have enough data for real-time playback.

Figure 8:
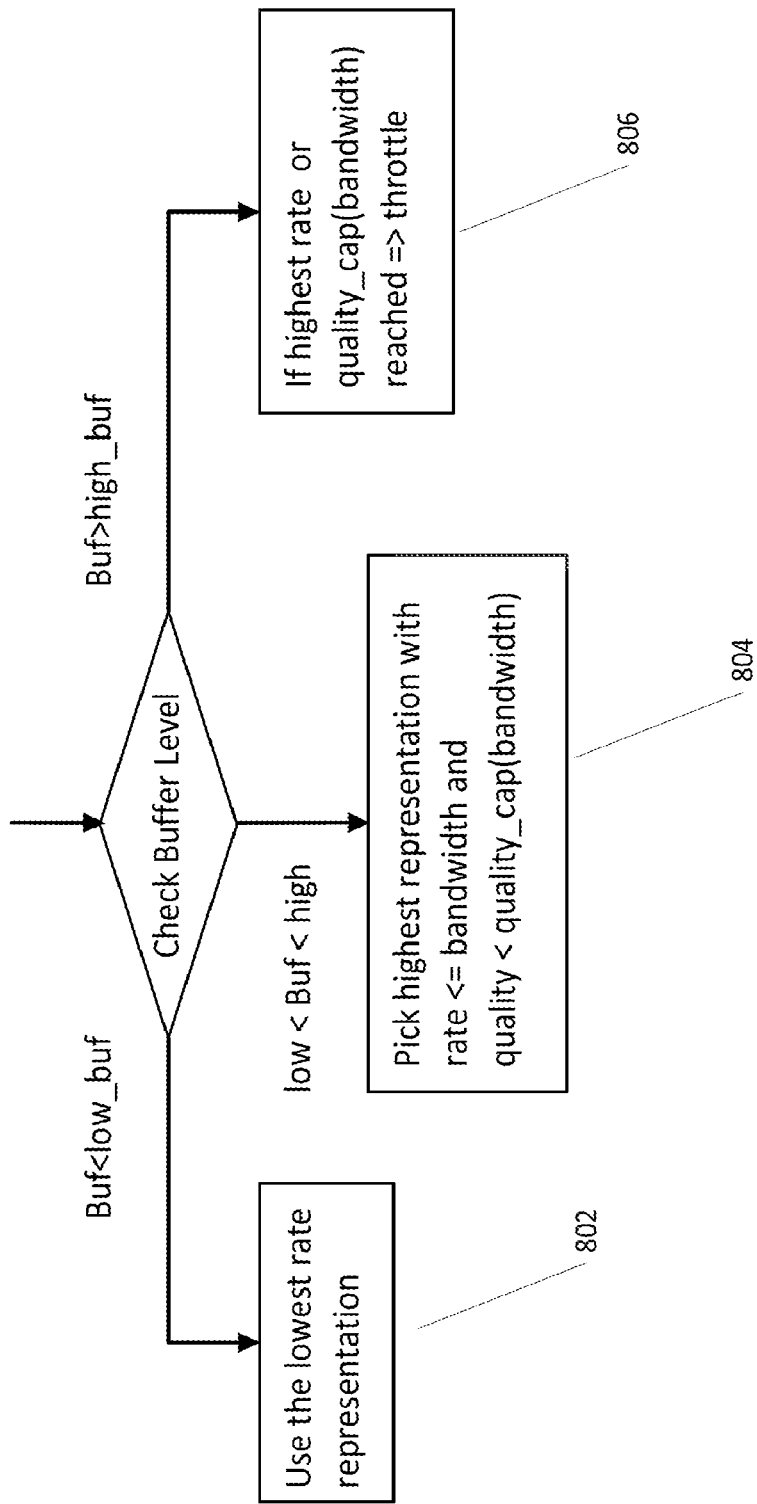
FIG. 8 is a diagram illustrating a model representation of an operation of a DASH streaming client using quality information.

A client adaptation model using per-segment quality and rate information may be provided. FIG. 8 is a diagram illustrating a model representation 800 of an operation of a DASH streaming client using quality information, which for example, may prevent selection of streams/segments whose quality is greater than a threshold quality_cap, for example, regardless of the bitrate. Such selection may result in more conservative bandwidth use and/or more consistent quality of experience to the end user. This quality information may be used, for example, in addition to buffer fullness information. As shown in FIG. 8 at 802, when a buffer level Buf is less than the low_buf threshold, the client may select the lowest rate representation to avoid rebuffering. As shown at 804, when the buffer level Buf is between the low_buf and high_buf thresholds, the client may, for example, select the highest rate representation that is lower than the available bandwidth and that has a quality that does not exceed a quality threshold quality_cap. As shown at 806, when the buffer level Buf is greater than the buf_high threshold, the client may check if the highest rate representation was reached. If so, the client may introduce one or more pauses between segment loads (e.g., throttling) as it may already have enough data for real-time playback.

To enable quality-based decisions in a streaming client, the client may have access to information about the quality of one or more of the encoded segments. There may be a plurality of places and a plurality of ways relating to how such information may be introduced in the MPEG-DASH standard. For example, one or more of PSNR, SSIM, VQM, VIF, J.341, MOS (e.g., in any permissible combination) and/or another objective and/or subjective measure may be used as an added quality metric.

Quality metrics may utilize a dB scale, such as PSNR, for example. Quality metrics may be mapped to an interval, for example, an interval [1 . . . 5] that may be associated with a 5-level MOS scale. Signaling for quality values may be flexible, for example, by allowing additions and extensions. Signaling for quality values may allow communication of metrics that may be scaled to a value range. For example, metrics may be scaled to a value range of MOS scores, such as 1 (lowest) to 5 (highest). Signaling for quality values may allow communication of PSNR.

Quality information may be granular. For example, quality information may be defined on a segment and/or sub-segment level, which may allow DASH clients to make decisions. Quality information may be accessible. For example, quality information may be accessible for segments and/or representations in the adaptation set, for example, so that a DASH client may retrieve (e.g., independently retrieve) the quality information ahead of time and before loading actual data segments. Quality information may be compact. For example, quality information may be compact so that loading of the quality information does not create major overhead in terms of the data that the streaming client is loading.

One way to add information about the quality of encoded segments may be by using tags (e.g., additional tags) in the Segment List portions of the MPD file. The Adaptation Set may comprise tags indicating the presence of quality values in the segment list. An example of such declarations is presented below:

```
<AdaptationSet segmentAlignment="true" bitstreamSwitching="true"
subsegmentAlignment="true" qualityInfo="true" qualityMetric="PSNR">
  <ContentComponent id="101" contentType="video"/>
```

```
  <ContentComponent id="102" contentType="audio"/>
  <Representation id="1" mimeType="video/mp4" codecs="avc1.42c00d"
width="320" height="180" sampleRate="44100" numChannels="1"
startWithRAP="1" bandwidth="134829">
    <SegmentList timescale="1000" duration="10000">
<RepresentationIndex>example_320×180_48kbps_av_index.didx
</RepresentationIndex>
    <SegmentURL media="example_320×180_48kbps_av0.m4s"
quality="33.1"/>
    <SegmentURL media="example_320×180_48kbps_av1.m4s"
quality="33.3"/>
    <SegmentURL media="example_320×180_48kbps_av2.m4s"
quality="33.8"/>
    <SegmentURL media="example_320×180_48kbps_av3.m4s"
quality="32.6"/>
```

An independent quality sequence descriptor may be described herein. Quality information may be included as a separate descriptor, for example, at the representation level. This descriptor may define a quality metric, may define an accuracy of a quality representation (e.g., a coarse representation may be used to make it more compact), and/or may define a sequence of quality values associated with segments in a representation.

The quality information descriptor at the representation level may comprise information about the actual compressed length of each segment, for example, in cases when an MPD may use segment templates and/or URLs to individual segment files. The quality information descriptor at the representation level may be defined as a case of a SupplementalProperty descriptor, and, for example, may comprise a schema uniform resource name (URN), which may provide a unique identifier associated with the quality signaling information.

An example implementation of a quality sequence descriptor is provided in Table 1.

TABLE 1

| Element or Attribute Name | Use | Description |
| --- | --- | --- |
| QualitySequence | | |
| @qualityMetric | OD default: PSNR | May indicate what metric may be used to express quality, which, for example, may be PSNR, MOS, and/or SSIM. This may be signaled as URN with separate schemas registered for PSNR, SSIM, etc. |
| @Accuracy | OD default: 1 | The default scale factor for value of @q in Q elements. |
| Q | 0 . . . N | |
| @s | O | Segment Number of the first segment included in the element. |
| @n | OD default: 1 | Number of segments included in the element sharing the same quality and bandwidth values. |
| @q | M | Scaled value of the quality metric in integer. |
| @b | O | Bandwidth for real time delivery of the segment, for example, in kbps. |

Legend: M = Mandatory, O = Optional, OD = Optional with Default Value, CM = Conditionally Mandatory.
For elements: <minOccurs> . . . <maxOccurs> (N = unbounded)

A way to add information about the quality of encoded segments may be to use Segment index (or Index Segment) files. Segment index files may comprise files (e.g., specialized files), may comprise segment index information, and/or may be stored along with .mpd and segment files on the HTTP server. Segment index files may comprise versions (e.g., specialized versions) of .mp4 files. Segment index files may comprise STYP, SIDX, and/or SSIX-type boxes, for example, with segment index information for the encoded representations. Segment indices may be embedded in the encoded media file (e.g., full .mp4 file), in which case the index-related boxes may be located at the beginning of the file.

Segment Index files may be referenced from MPD files, for example, by the presence of a RepresentationIndex element providing the Segment Index for the Representation. Segment Index files may be referenced from MPD files, for example, by presence of at least one of two attributes @index or @indexRange in a SegmentList.SegmentURL element. Segment Index files may be referenced from MPD files, for example, by the presence of a SegmentTemplate@index attribute.

The @indexRange attribute may be used to provide the byte range for an index within a Media Segment. This may be done when permitted by the Media Segment format. For example, the @index attribute may not be present, and the range specified may lie partially or completely within a byte range specified for the Media Segment.

Segment index files used for quality signaling may comprise an indication that quality information may be present in the index files (e.g., by means of a descriptor or attribute in the MPD file), a specification of the type of quality metric (e.g., included in the MPD and/or within segment index boxes), and/or a list of quality values for a segment and/or sub-segment in a representation. The list of quality values may be compressed, for example, by means of run-length encoding.

Segment index files used for quality signaling may comprise a number of descriptive elements. For example, a segment index file may indicate that quality information is present in an index file, e.g., using a descriptor or attribute in an MPD file. A segment index file may comprise a specification of a type of quality metric, e.g., in an MPD file or within a segment index box. A segment index file may comprise a list of quality values for one or more segments or Sub-segments in a representation. This list may be compressed, for example, using run-length encoding.

In order to store quality parameters in ISOBMFF-based file container, boxes may be defined. For example, Table 2 listed below may be added at the end of the Table 1 of ISO/IEC 14496-12.

TABLE 2

| qtyp | <<ref>> | quality metric type |
|------|---------|---------------------|
| sqls | <<ref>> | segment quality list |
| ssql | <<ref>> | sub-segment quality list |

The following definitions may apply. qtyp may denote a box that describes the type of quality metric, such as, but not limited to PSNR, SSIM, MS-SSIM, and/or VQM. sqls may denote a box including a list of quality metrics for segments in a representation. An example syntax is illustrated below.

```
aligned(8) class SegmentIndexBox extends FullBox('sqls', version, 0) {
    Cunsigned int(16) reserved = 0;
    unsigned int(16) segment_count;
    for(i=1; i <= segment_count; i++)
    {
        unsigned int (1)  segment_quality;
    }
}
``` ssql may denote a box including a list of quality metrics for Sub-segments in a segment. An example syntax is illustrated below.

```
aligned(8) class SegmentIndexBox extends FullBox('ssql', version, 0) {
    Cunsigned int(16) reserved = 0;
    unsigned int(16) sub_segment_count;
    for(i=1; i <= segment_count; i++)
    {
        unsigned int (1)  sub_segment_quality;
    }
}
```

To indicate to a client that quality information is present in the index files, the MPD file syntax may be extended to allow an extra qualityInfoPresentInIndexFiles flag. An example of usage of this file is shown below:

```
<AdaptationSet segmentAlignment="true" bitstreamSwitching="true"
subsegmentAlignment="true" qualityInfoPresentInIndexFiles ="true">
    <ContentComponent id="101" contentType="video"/>
    <ContentComponent id="102" contentType="audio"/>
    <Representation id="1" mimeType="video/mp4" codecs="avc1.42c00d"
    width="320" height="180" sampleRate="44100" numChannels="1"
    startWithRAP="1" bandwidth="134829">
        <SegmentList timescale="1000" duration="10000">
        <RepresentationIndex>example_320x180_48kbps_av_index.didx
        </RepresentationIndex>
```

Information about the quality of encoded segments may be added by using and/or storing separate files with their own syntax. Such files may be associated with a corresponding Adaptation Set in a MPD file, for example, by means of a descriptor. An example of such a descriptor is shown below.

```
<QualityInfo
    schemeIdUri="urn:mpeg:dash:qual-dsc:2012" >
    <Component>="video"
    <QualityMetric>="PSNR"
    QualityUrl="http://example.com/.../segments_psnr_t328.xyz" />
</QualityInfo>
```

This may provide a path to deployment with systems (e.g., existing systems) and encoded content.

Figure 9:
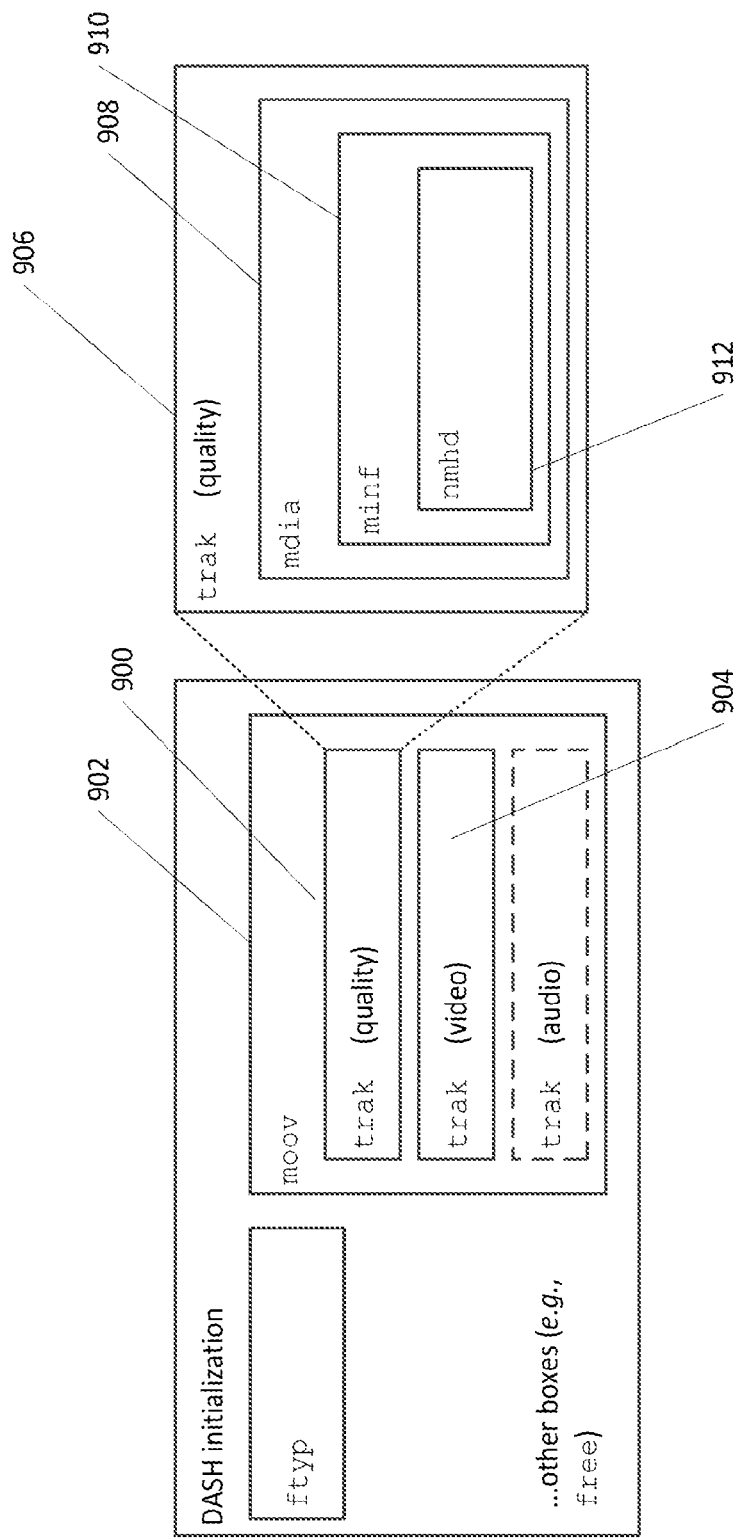
FIG. 9 is a diagram illustrating an example of a quality information track added to a DASH presentation.

FIG. 9 is a diagram illustrating an example of a quality information track 900 added to a DASH presentation. Quality information may be embedded in a media data container (mdat) box 902. Quality information may be stored within the media data container (mdat) box 902 as a quality information track 900 along with a video track 904 within the presentation. To add a quality information track 900, the DASH initialization segment may list the added track, for example, as shown in FIG. 9.

Within a container 906 for media information in a track (trak box), a container 908 for media information in a track (e.g., mdia box) may comprise a media information container 910 (e.g., minf box). For the quality information track 900, the media information container 910 (e.g., minf box) may utilize a null media header (e.g., nmhd box 912) type. In the nmhd box 912, the quality information may be provided and may comprise, for example, the type of quality metric (e.g., PSNR, SSIM, etc.). An example of syntax for a nmhd box 912 that may include quality information is provided below:

```
aligned(8) class NullMediaHeaderWithQualityInfo extends
FullBox('nmhd, version, 0) {
    unsigned int(16) reserved = 0;
    unsigned int (8) quality_metric_type;
}
```

The quality_metric_type may be an enumeration. For example, 0 may indicate PSNR, 1 may indicate SSIM, etc. The presence of the quality information track 900 may be signaled in the description file, for example, as provided below:

```
<AdaptationSet segmentAlignment="true" bitstreamSwitching="true"
subsegmentAlignment="true" qualityInfoTrackPresent ="true">
    <ContentComponent id="100" contentType="quality"/>
    <ContentComponent id="101" contentType="video"/>
    <ContentComponent id="102" contentType="audio"/>
    <Representation id="1" mimeType="video/mp4" codecs="avc1.42c00d"
width="320" height="180" sampleRate="44100" numChannels="1"
startWithRAP="1" bandwidth="134829">
    <SegmentList timescale="1000" duration="10000">
```

Figure 10:
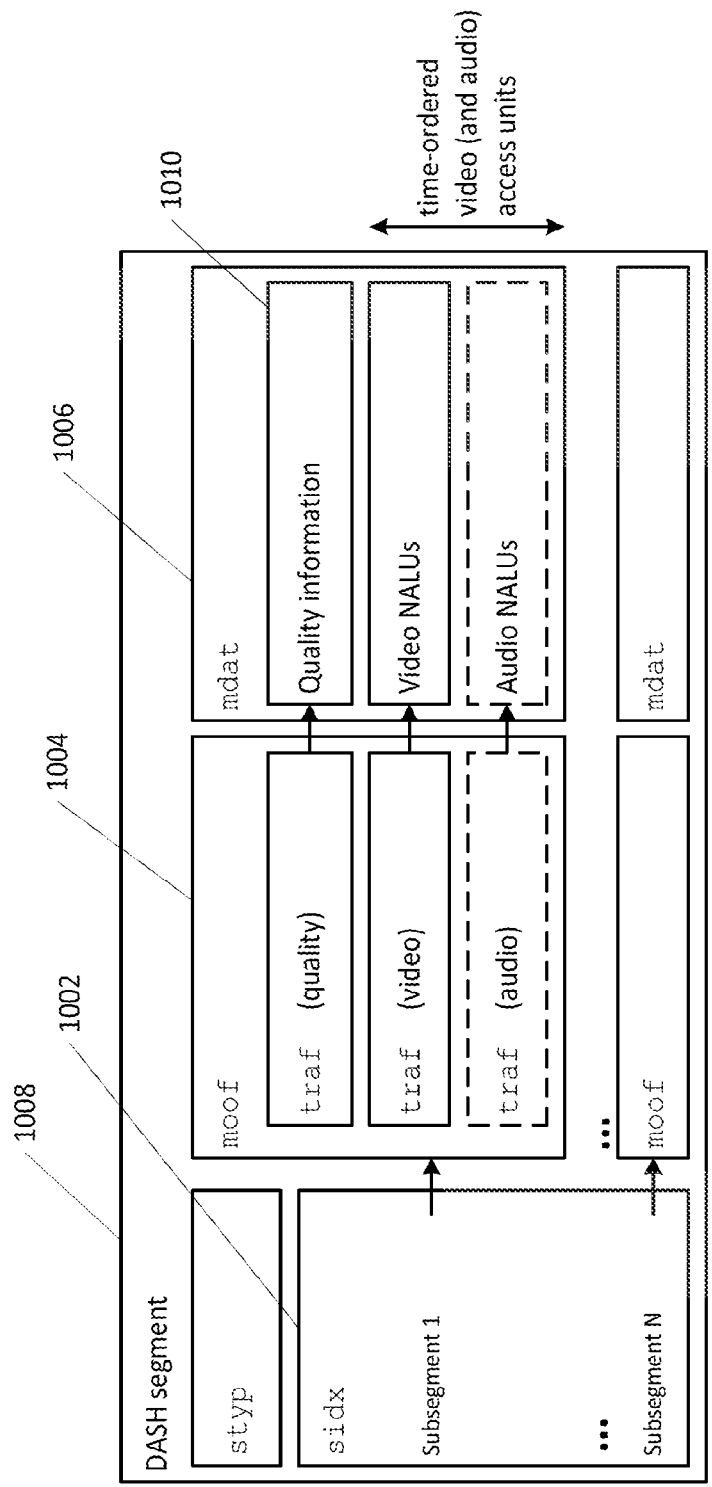
FIG. 10 is a diagram illustrating an example of quality information stored in an mdat box within a DASH segment.

As shown in FIG. 10, a sidx (segment index) box 1002 may include a list of pointers to pairs of moof boxes 1004 and mdat boxes 1006. Each pair may represent a sub-segment, for example, as shown in FIG. 10. The moof box 1004 may list tracks present in the mdat box 1006.

FIG. 10 is a diagram illustrating an example of quality information stored in an mdat box within a DASH segment 1008. Quality information may be added at the sub-segment level. For example, a quality track 1010 may be added in the mdat box 1006, which, for example, may summarize the quality information of the video track at the sub-segment level. The quality information may appear at the beginning of mdat box 1006, for example, so that it can be easily retrieved by the client. The moof box 1004 may comprise a listing 1012 that may indicate the presence of the quality track 1010. An example syntax for the quality information in an mdat box 1006 may be provided below:

```
aligned(8) class QualityTrack extends {
    unsigned int (16) sub_segment_quality;
}
```

Figure 11:
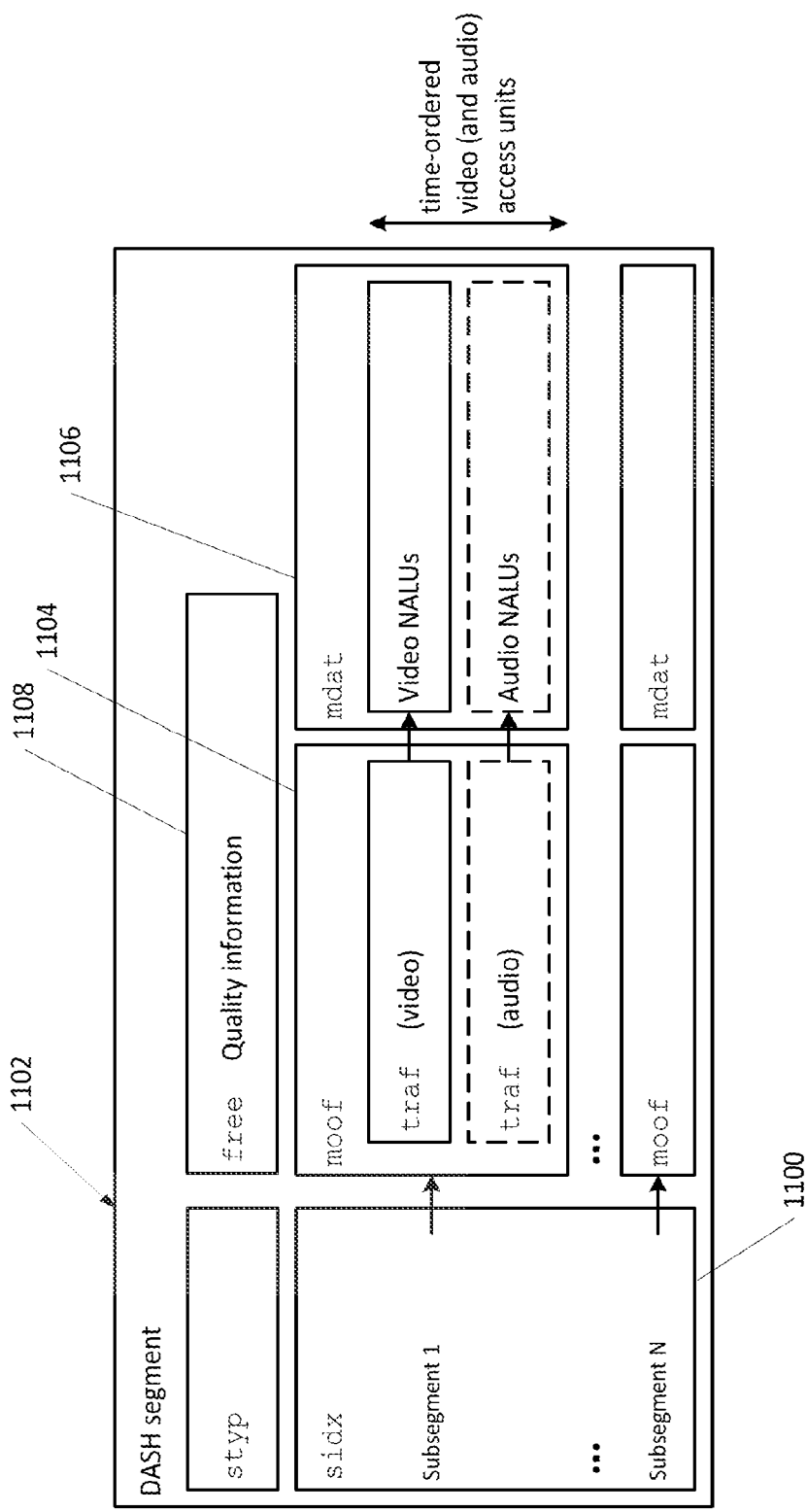
FIG. 11 is a diagram illustrating an example of quality information stored in a free or skip box within a DASH segment.

Quality information may be provided in a free space (e.g., free or skip) box. Information about quality may be stored within the free space (e.g., free or skip) box within a MPEG DASH segment. For example, the contents of a free space box may be irrelevant and/or may be ignored without affecting the presentation. The free or skip boxes may be top-level boxes (e.g., a peer to a Movie Box mbox box and/or a Media Data mdat box). As shown in FIG. 11, the free or skip boxes may be placed after the segment index sidx box 1100 in a MPEG DASH segment 1102, such as near the beginning of the segment, for example. A pair of a moof box 1104 and/or a mdat box 1106 may represent a sub-segment and/or may correspond to the moov and/or mdat pair in an MP4 file. A free and/or skip box 1108 may be added near the beginning of the segment, for example, such that they may be accessed prior to fetching the entire segment.

The presence of a free and/or skip box 1108 may be signaled in the description file, for example, as provided below:

```
<AdaptationSet segmentAlignment="true" bitstreamSwitching="true"
subsegmentAlignment="true" qualityInfoPresentInFreeBoxes ="true">
    <ContentComponent id="101" contentType="video"/>
    <ContentComponent id="102" contentType="audio"/>
    <Representation id="1" mimeType="video/mp4" codecs="avc1.42c00d"
width="320" height="180" sampleRate="44100" numChannels="1"
startWithRAP="1" bandwidth="134829">
    <SegmentList timescale="1000" duration="10000">
```

FIG. 11 is a diagram illustrating an example of quality information stored in a free or skip box 1108 within a DASH segment 1102. For example, the free and/or skip box 1108 may be added at the time a segment is created. If the free and/or skip boxes 1108 are added after the segments are created (e.g., in previously created DASH content), the offsets used in the sample table of sidx may be re-calculated.

The format of the free and/or skip box 1108 may be defined. For example, a syntax similar to the one proposed for use with segment index files may be utilized. An example syntax is provided below:

```
aligned(8)  class FreeSpaceBox extends FullBox(free_type) {
            unsigned int(16) reserved = 0;
            unsigned int (16) subsegment_count;
            for(i=1; i <= subsegment_count; i++)    {
                unsigned int (1)  subsegment_quality;
            }
}
```

The features and elements described herein may be applied to HTTP Live Streaming (HLS) and/or other streaming systems. Signaling of quality information for a segment may be added ahead of time. This information may be used by a client when selecting a stream to which to request and/or subscribe.

The addition of quality-related information may be accomplished by including the quality-related information in a manifest file (e.g., a .mdp file), including the quality-related information in segment indices stored in a segment index file (e.g., MP4 or M4S files), and/or providing additional files with quality/segment information and providing a link to it from an MPD file.

Dynamic Adaptive HTTP Streaming (DASH) is a standard that may consolidate several approaches for HTTP streaming. MPEG DASH may be an extension of "3GP-DASH." DASH may be used to cope with variable bandwidth in wireless and wired networks and may be supported by content providers and devices. DASH may enable multimedia streaming services over any access network to any device.

Figure 12:
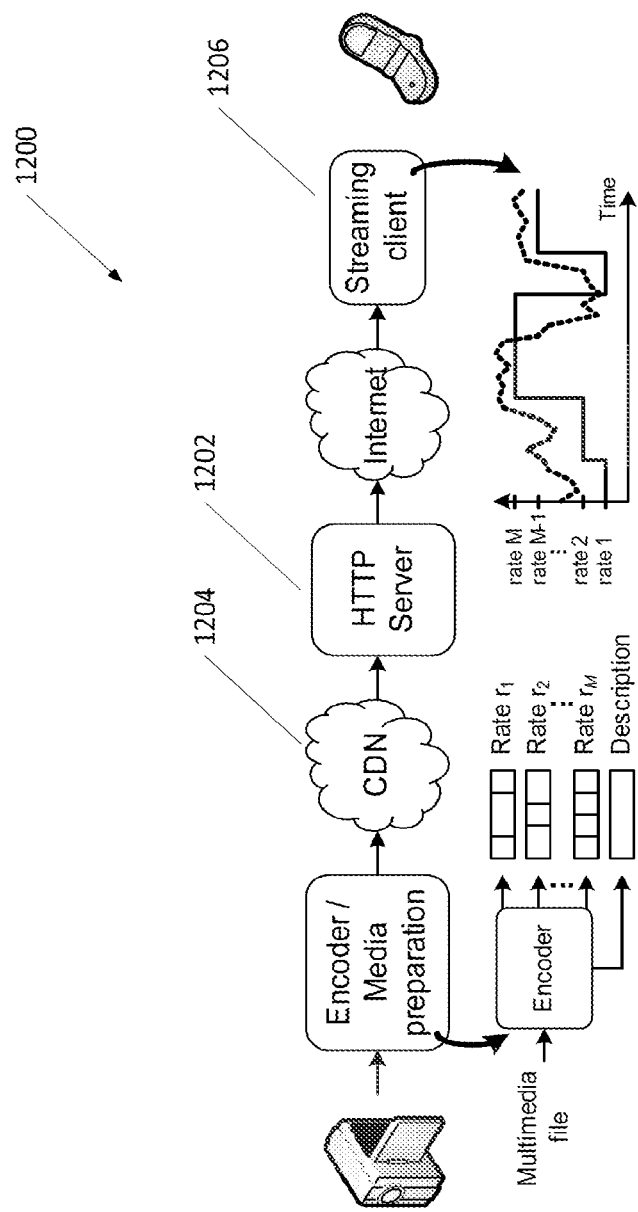
FIG. 12 is a diagram illustrating an example of the high-level architecture of a DASH system.

FIG. 12 is a diagram illustrating an example of a high-level architecture of a DASH system 1200. A DASH system may be deployed as a set of HTTP servers 1202 that may distribute live and/or on-demand content that has been prepared in a suitable format. Clients may access content directly from these HTTP servers and/or from a Content Distribution Network (CDN) or CDNs 1204. CDNs may be used for deployments where a large number of clients are expected, as they may cache content and may be located near the clients at the edge of the network.

In DASH, the streaming session may be controlled by a client 1206 by requesting segments using HTTP and splicing them together as they are received from the content provider and/or CDN 1204. Clients may monitor, e.g., continually monitor, and adjust media rate based on network conditions (e.g., packet error rate, delay jitter) and their own state (e.g., buffer fullness, user behavior, preferences), effectively moving intelligence from the network to the clients.

Figure 13:
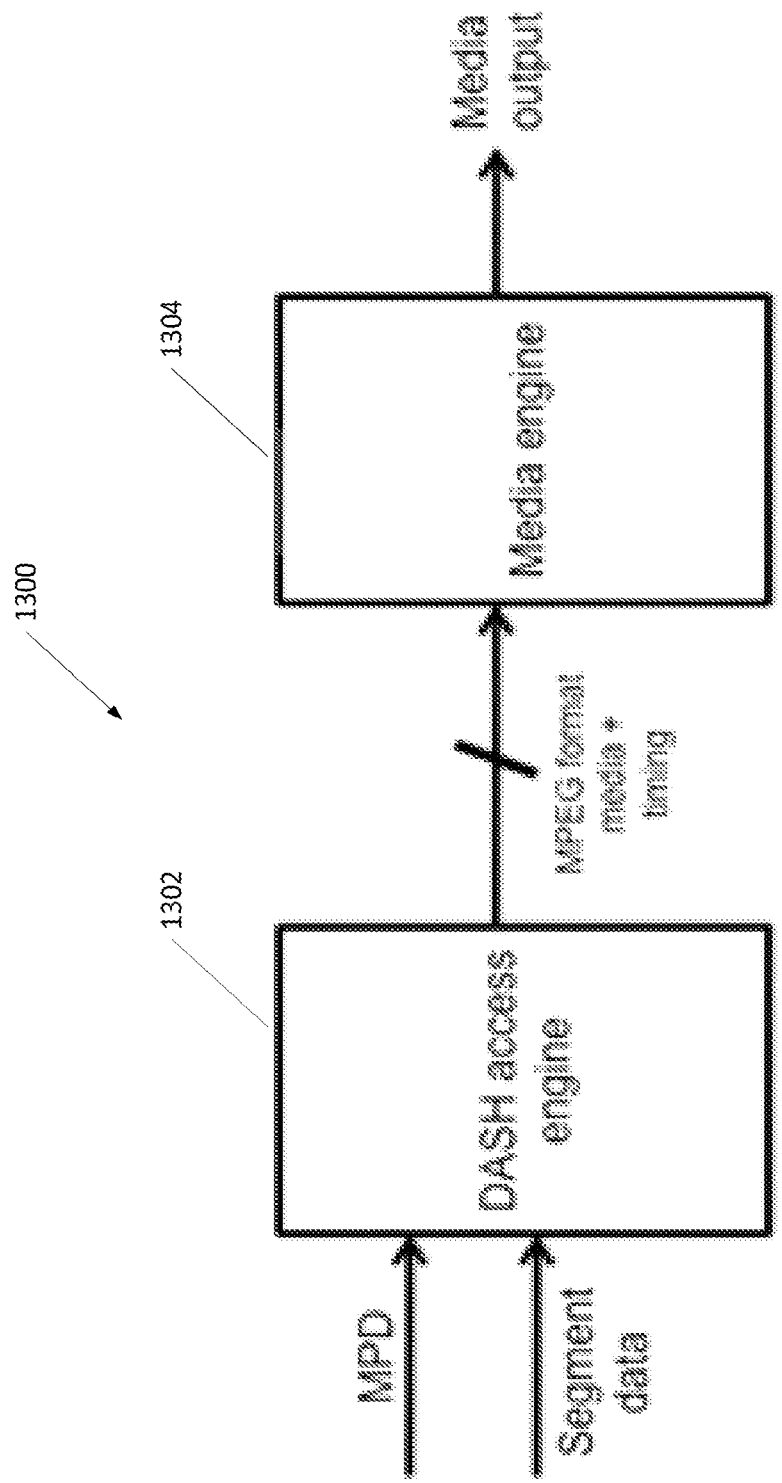
FIG. 13 is a diagram illustrating an example of the logical components of a DASH client model.

The DASH standard may be similar to informative client models. FIG. 13 is an example of the logical components of a conceptual DASH client model 1300. The DASH Access Engine may receive the media presentation description file (MPD). A DASH Access Engine 1302 may construct and issue requests, and receive segments or parts of segments. The output of the DASH Access Engine 1302 may comprise media in MPEG container formats (e.g., MP4 File Format and/or MPEG-2 Transport Stream) and/or timing information that may map the internal timing of the media to the timeline of the presentation. The combination of encoded chunks of media and/or timing information may be sufficient for correct rendering of the content.

Some of the constraints that DASH imposes on encoded media segments are based on an assumption that decoding, postprocessing, and/or playback may be done by a media engine 1304 that may have no information relating to the nature of the encoded media segments and/or how the encoded media segments were delivered. The media engine 1304 may decode and play a continuous media file, fed in chunks by the DASH access engine.

For example, the DASH access engine 1302 may use JavaScript, while the media engine 1304 may be provided by a browser, a browser plugin (such as, but not limited to Flash or Silverlight), and/or an operating system.

Figure 14:
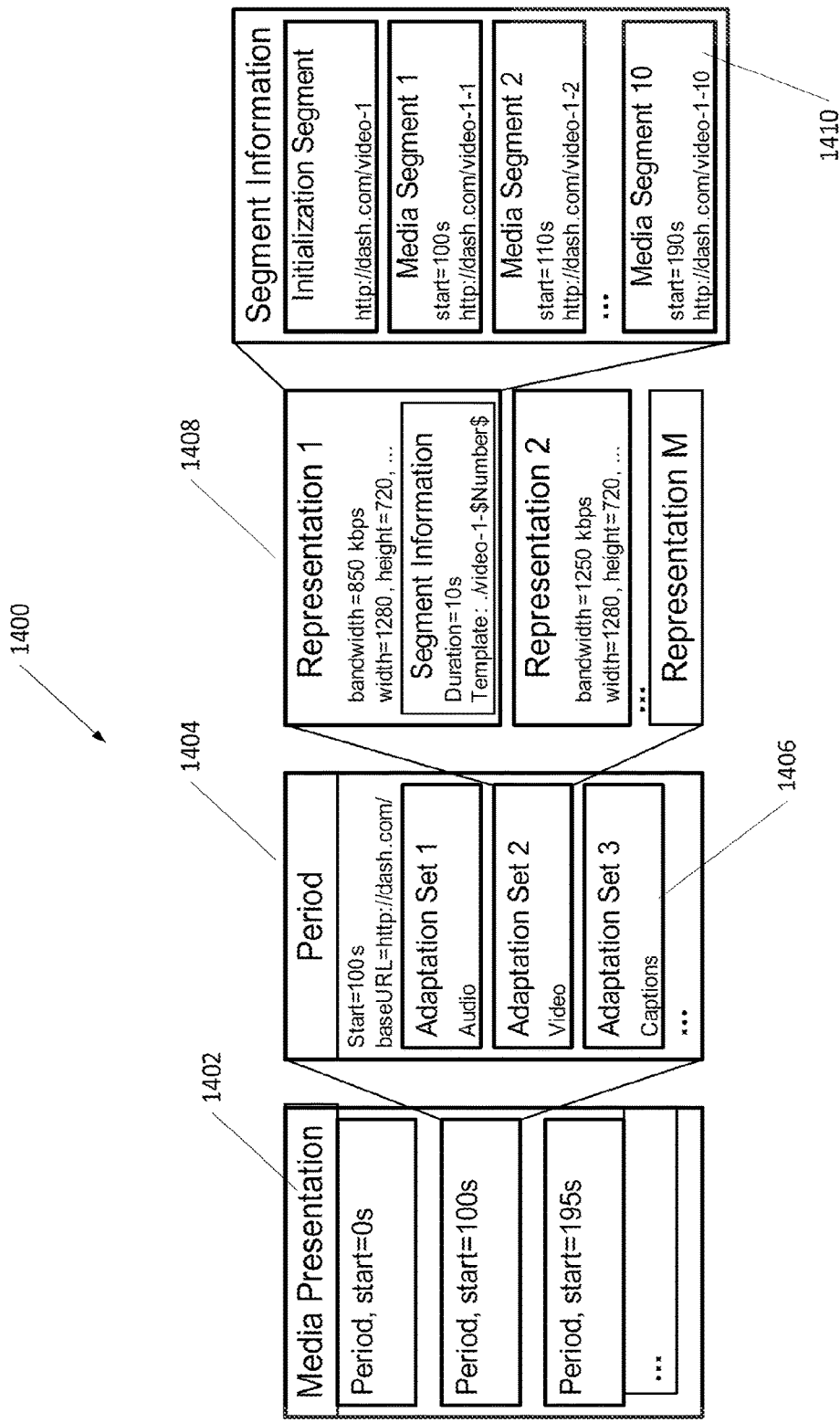
FIG. 14 is a diagram illustrating an example of a DASH Media Presentation high-level data model.

FIG. 14 is a diagram illustrating an example of a DASH Media Presentation high-level data model 1400. In DASH, the organization of a multimedia presentation 1402 may be based on a hierarchical data model. A Media Presentation Description (MPD) may describe the sequence of Periods 1404 that make up a DASH media presentation (e.g., the multimedia content). A Period 1404 may represent a media content period during which a set of encoded versions of the media content is available. For example, the set of available bit rates, languages, and/or captions may not change during a Period 1404.

An Adaptation Set 1406 may represent a set of interchangeable encoded versions of one or more media content components. For example, there may be an Adaptation Set 1406 for video, one for primary audio, one for secondary audio, and/or one for captions. The Adaptation Sets 1406 may be multiplexed, in which case interchangeable versions of the multiplex may be described as a single Adaptation Set 1406. For example, an Adaptation Set 1406 may include video and/or audio for a Period 1404.

A Representation 1408 may describe a deliverable encoded version of one or more media content components. A Representation 1408 may comprise one or more media streams (for example, one for each media content component in the multiplex). A single Representation 1408 within an Adaptation Set 1406 may be sufficient to render the included media content components. Clients may switch from one Representation 1408 to another Representation 1408 within an Adaptation Set 1406 in order to adapt to network conditions or other factors. A client may ignore Representations 1408 that use codecs, profiles, and/or parameters that the client does not support. Content within a Representation 1408 may be divided in time into Segments 1410 of fixed or variable length. A URL may be provided for each Segment 1410. A Segment 1410 may be the largest unit of data that may be retrieved with a single HTTP request.

The Media Presentation Description (MPD) may be an XML document that may comprise metadata that may be used by a DASH client to construct appropriate HTTP-URLs to access Segments and/or to provide the streaming service to the user. A Base URL in the MPD may be used by the client to generate HTTP GET requests for Segments and other resources in the Media Presentation. HTTP partial GET requests may be used to access a limited portion of a Segment by using a byte range (e.g., via the 'Range' HTTP header). Alternative base URLs may be specified to allow access to the presentation in case a location is unavailable, providing redundancy to the delivery of multimedia streams, allowing client-side load balancing, and/or parallel download.

An MPD may be static or dynamic in type. A static MPD type may or may not change during the Media Presentation, and may be used for on demand presentations. A dynamic MPD type may be updated during the Media Presentation, and may be used for live presentations. An MPD may be updated to extend the list of Segments for each Representation, introduce a new Period, and/or terminate the Media Presentation.

In DASH, encoded versions of different media content components (e.g., video, audio) may share a common timeline. The presentation time of access units within the media content may be mapped to a global common presentation timeline, which may be referred to as a Media Presentation Timeline. This mapping may allow synchronization of different media components and may facilitate seamless switching of different coded versions (e.g., Representations) of the same media components.

Segments may comprise the actual segmented media streams. They may include information relating to how to map the media stream into the media presentation timeline for switching and/or synchronous presentation with other Representations.

A Segment Availability Timeline may be used to signal to a client the availability time of segments at the specified HTTP URLs. For example, these times may be provided in wall-clock times. Before accessing the Segments at the specified HTTP URL, clients may compare the wall-clock time to Segment availability times. For on-demand content, the availability times of Segments may be identical. Segments of the Media Presentation may be available on the server once a Segment is available. The MPD may be a static document.

For live content, the availability times of Segments may depend on the position of the Segment in the Media Presentation Timeline. Segments may become available with time as the content is produced. The MPD may be updated periodically to reflect changes in the presentation over time. For example, Segment URLs for new segments may be added to the MPD. Old segments that are no longer available may be removed from the MPD. Updating the MPD may be omitted if Segment URLs are described using a template.

The duration of a segment may represent the duration of the media included in the Segment when presented at normal speed. Segments in a Representation may have the same or roughly similar duration. Segment duration may differ from Representation to Representation. A DASH presentation may be constructed with relatively short segments (for example, a few seconds), or longer Segments, including a single Segment for the whole Representation.

Short segments may be suitable for live content (for example, by reducing end-to-end latency) and may allow for high switching granularity at the Segment level. Small segments may increase the number of files in the presentation. Long segments may improve cache performance by reducing the number of files in the presentation. Long segments may enable clients to make flexible request sizes (for example, by using byte range requests). Using long segments may involve the use of a Segment Index and may be less suitable for live events. Segments may or may not be extended over time. A Segment may be a complete and discrete unit that may be made available in its entirety.

Segments may be further subdivided into Sub-segments. Each Sub-segment may comprise a whole number of complete access units. An access unit may be a unit of a media stream with an assigned Media Presentation time. If a Segment is divided into Sub-segments, these may be described by a Segment Index. A Segment Index may provide the presentation time range in the Representation and corresponding byte range in the Segment occupied by each Sub-segment. A client may download this index in advance and issue requests for individual Sub-segments using, for example, HTTP partial GET requests. The Segment Index may be included in the Media Segment, for example, in the beginning of the file. Segment Index information may be provided in separate Index Segments.

DASH may define, for example, a number of types of segments, including but not limited to Initialization Segments, Media Segments, Index Segments, and/or Bitstream Switching Segments. Initialization Segments may include initialization information for accessing the Representation. Initialization Segments may or may not include media data with an assigned presentation time. Conceptually, the Initialization Segment may be processed by the client to initialize the media engines for enabling play-out of Media Segments of the including Representation.

A Media Segment may comprise and may encapsulate media streams that are either described within the Media Segment and/or described by the Initialization Segment of the Representation. Media Segments may comprise a number of complete access units and may comprise at least one Stream Access Point (SAP) for each included media stream.

Index Segments may comprise information that is related to Media Segments. Index Segments may comprise indexing information for Media Segments. An Index Segment may provide information for one or more Media Segments. The Index Segment may be media format specific, and details may be defined for each media format that supports Index Segments.

A Bitstream Switching Segment may comprise data for switching to the Representation to which it is assigned. A Bitstream Switching Segment may be media format specific, and details may be defined for media formats that permit Bitstream Switching Segments. One Bitstream Switching Segment may be defined for each Representation.

Clients may switch from Representation to Representation within an Adaptation Set at any point in the media. Switching at arbitrary positions may be complicated because of coding dependencies within Representations and other factors. Download of overlapping data (e.g., media for the same time period from multiple Representations) may be avoided. Switching may be simpler at a random access point in the new stream. DASH may define a codec-independent concept of Stream Access Point (SAP) and identify various types of Stream Access Points. A stream access point type may be communicated as one of the properties of the Adaptation Set (for example, assuming that all segments within adaptation set have same SAP types).

A Stream Access Point (SAP) may enable random access into a file container of one or more media streams. A SAP may be a position in a container enabling playback of an identified media stream to be started using the information included in the container starting from that position onwards and/or possible initialization data from another part or other parts of the container. The initialization data may be externally available.

A number of file container properties may be defined. $T_{SAP}$ may be a presentation time, e.g., the earliest presentation time of an access unit of the media stream such that all access units of the media stream with presentation time greater than or equal to the $T_{SAP}$ may be correctly decoded using data in the bitstream starting at $I_{SAP}$ and no data before $I_{SAP}$.

$I_{SAP}$ may be the position in the bitstream such that access units of the media stream with presentation time greater than or equal to $T_{SAP}$ may be correctly decoded using the bitstream data starting at $I_{SAP}$ and with or without data starting before $I_{SAP}$.

$I_{SAU}$ may be the starting position in the bitstream of the latest access unit in decoding order within the media stream such that access units of the media stream with presentation time greater than or equal to $T_{SAP}$ can be correctly decoded using this latest access unit and access units following in decoding order and no access units earlier in decoding order.

$T_{DEC}$ may be the earliest presentation time of an access unit of the media stream that can be correctly decoded using data in the bitstream starting at $I_{SAU}$ and with or without data starting before $I_{SAU}$. $T_{EPT}$ may be the earliest presentation time of an access unit of the media stream starting at $I_{SAU}$ in the bitstream. $T_{PTF}$ may be the presentation time of the first access unit of the media stream in decoding order in the bitstream starting at $I_{SAU}$.

Figure 15:
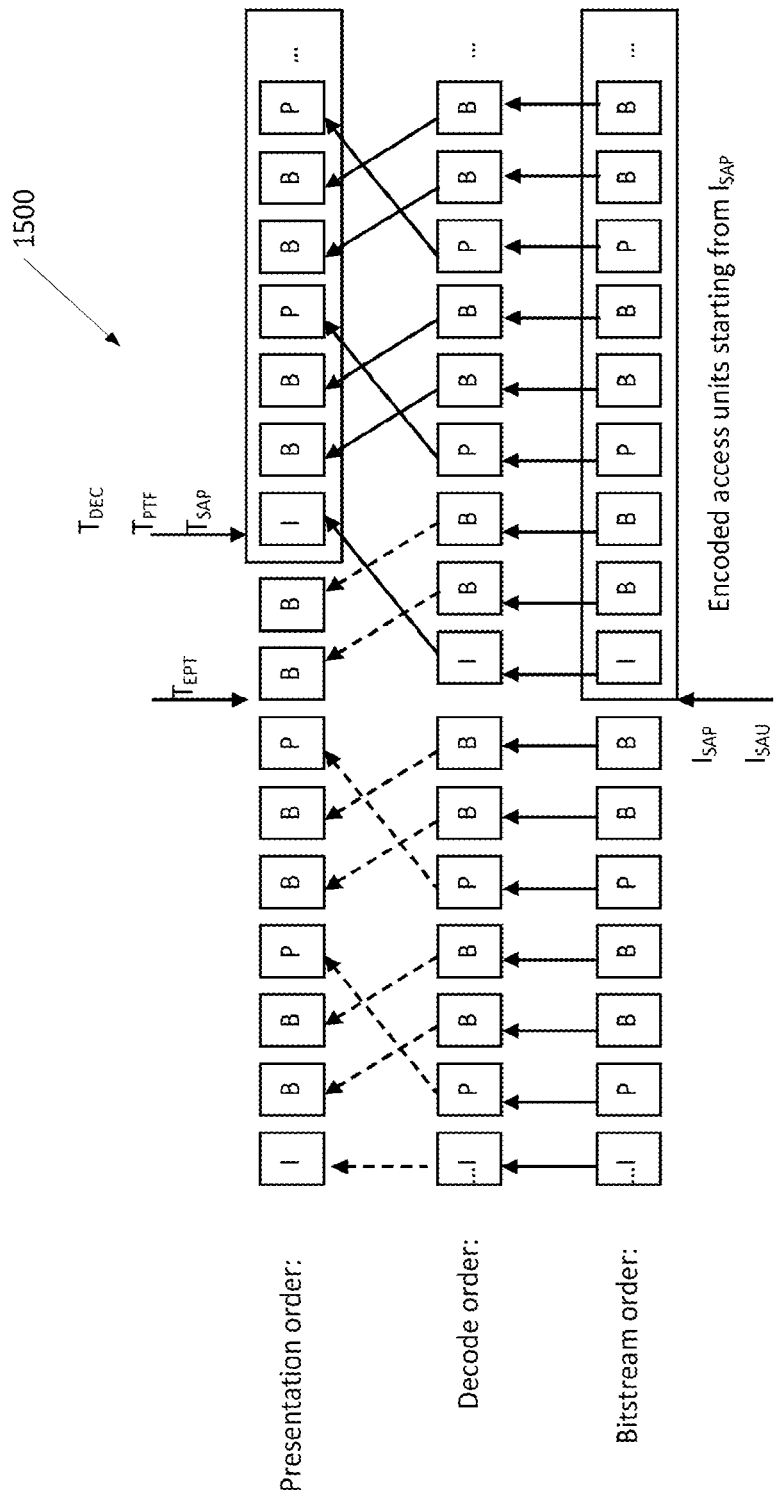
FIG. 15 is a diagram illustrating an example of an encoded video stream with three different types of frames.

FIG. 15 is an example of a stream access point with parameters. FIG. 15 illustrates an encoded video stream 1500 with three different types of frames: I, P, and B. P-frames may utilize (e.g., only utilize) prior I or P frames to be decoded, while B-frames may utilize prior and following I and/or P frames. There may be differences in transmission, decoding, and/or presentation orders in I, P, and/or B frames.

The type of SAP may be dependent on which Access Units are correctly decodable and/or their arrangement in presentation order. Examples of six SAP types are described herein. One type, in which $T_{EPT}=T_{DEC}=T_{SAP}=T_{PFT}$, may correspond to what is known as a "Closed GoP random access point." Access units (in decoding order) starting from $I_{SAP}$ may be correctly decoded. The result may be a continuous time sequence of correctly decoded access units with no gaps. The first access unit in decoding order may be the first access unit in presentation order.

In another SAP type, $T_{EPT}=T_{DEC}=T_{SAP}<T_{PFT}$. This SAP type may correspond to what is known as a "Closed GoP random access point" for which the first access unit in decoding order in the media stream starting from $I_{SAU}$ may not be the first access unit in presentation order. For example, the first two frames may be backward predicted P frames (which syntactically may be coded as forward-only B-frames in H.264 and some other codecs), and/or they may or may not need a third frame to be decoded.

In another SAP type, $T_{EPT}<T_{DEC}=T_{SAP}<=T_{PTF}$. This SAP type may correspond to what is known as an "Open GoP random access point," in which there may be some access units in decoding order following $I_{SAU}$ that may not be correctly decoded and/or may have presentation times less than $T_{SAP}$.

In another SAP type, $T_{EPT}<=T_{PFT}<T_{DEC}=T_{SAP}$. This SAP type may correspond to what is known as a "Gradual Decoding Refresh (GDR) random access point," or a "dirty" random access, in which there may be some access units in decoding order starting from and following $I_{SAU}$ that may not be correctly decoded and/or may have presentation times less than $T_{SAP}$. One example case of GDR may be an intra refreshing process, which may be extended over N frames with part of a frame coded with intra MBs. Non-overlapping parts may be intra coded across N frames. This process may be repeated until the entire frame is refreshed.

In another SAP type, $T_{EPT}=T_{DEC}<T_{SAP}$. This SAP type may correspond to a case for which there is at least one access unit in decoding order starting from $I_{SAP}$ that may not be correctly decoded, may have a presentation time greater than $T_{DEC}$, and/or where $T_{DEC}$ may be the earliest presentation time of an access unit starting from $I_{SAU}$.

In another SAP type, $T_{EPT}<T_{DEC}<T_{SAP}$. This SAP type may correspond to a case for which there may be at least one access unit in decoding order starting from $I_{SAP}$ that may not be correctly decoded, may have a presentation time greater than $T_{DEC}$, and/or where $T_{DEC}$ may not be the earliest presentation time of an access unit starting from $I_{SAU}$.

Profiles of DASH may be defined to enable interoperability and the signaling of the use of features. A profile may impose a set of restrictions. These restrictions may be on features of the Media Presentation Description (MPD) document and/or on Segment formats. The restriction may be on content delivered within Segments, such as but not limited to on media content types, media format(s), codec(s), and/or protection formats, and/or on quantitative measures such as but not limited to bit rates, Segment durations and sizes, and/or horizontal and vertical visual presentation size.

Figure 16:
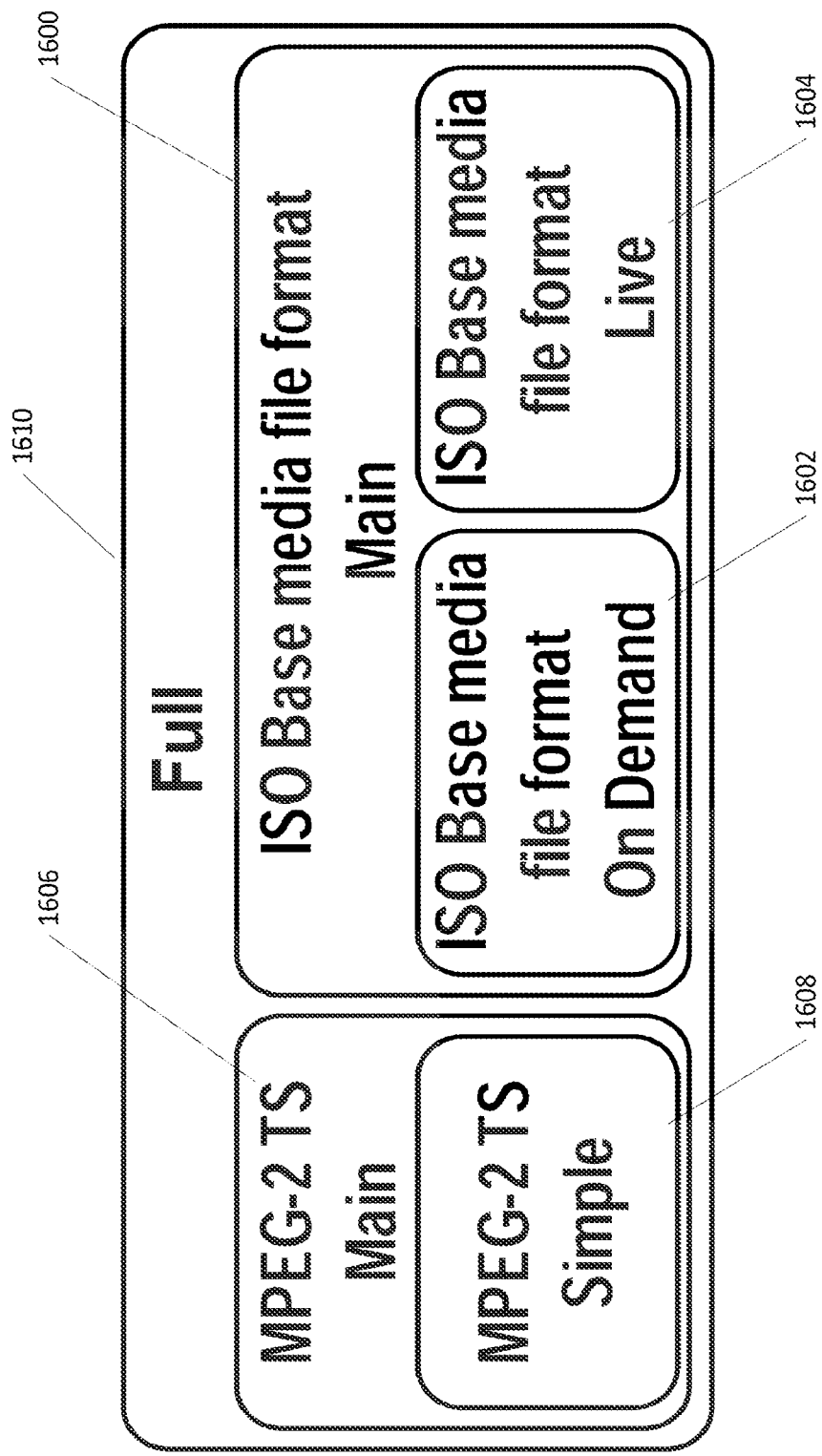
FIG. 16 is a diagram of an example of six different DASH profiles.

For example, DASH may define a number of profiles shown in FIG. 16. Profiles may be organized in two categories based on the type of file container used for segments. Three profiles 1600, 1602, 1604 may use ISO Base media file containers, two profiles 1606, 1608 may use MPEG-2 transport stream (TS) based file containers, and one profile 1610 may support both file container types. Either container type may be codec independent.

The ISO Base media file format of the On Demand profile 1602 may provide basic support for on demand content. Constraints of the On Demand profile 1602 may be that each Representation may be provided as a single Segment, Sub-segments may be aligned across Representations within an Adaptation Set, and/or Sub-segments may begin with Stream Access Points. The On Demand profile 1602 may be used to support large Video on Demand (VoD) libraries with relatively little content management. The On Demand profile 1602 may permit scalable and efficient use of HTTP servers and may simplify seamless switching.

The ISO Base media file format Live profile 1604 may be optimized for live encoding and/or low latency delivery of Segments consisting of a single movie fragment of ISO file format with relatively short duration. Each movie fragment may be requested when available. This may be accomplished, for example, using a template generated URL. Requests for MPD updates may be omitted for some Segment requests. Segments may be constrained so that they may be concatenated on Segment boundaries, and decrypted without gaps and/or overlaps in the media data. This may be regardless of adaptive switching of the Representations in an Adaptation Set. This profile 1604 may be used to distribute non-live content. For example, the Live profile 1604 may be used when a live Media Presentation has terminated, but is kept available as an On-Demand service. The ISO Base media file format Main profile 1600 may be a superset of the ISO Base media file format On Demand profile 1602 and Live profile 1604.

The MPEG-2 TS main profile 1606 may impose little constraint on the Media Segment format for MPEG-2 Transport Stream (TS) content. For example, representations may be multiplexed, so no binding of media streams (audio, video) at the client may be required. For example, Segments may include an integer number of MPEG-2 TS packets. For example, Indexing and Segment alignment may be recommended. HTTP Live Streaming (HLS) content may be integrated with this profile 1606 by converting an HLS media presentation description (.m3u8) into a DASH MPD.

Figure 17:
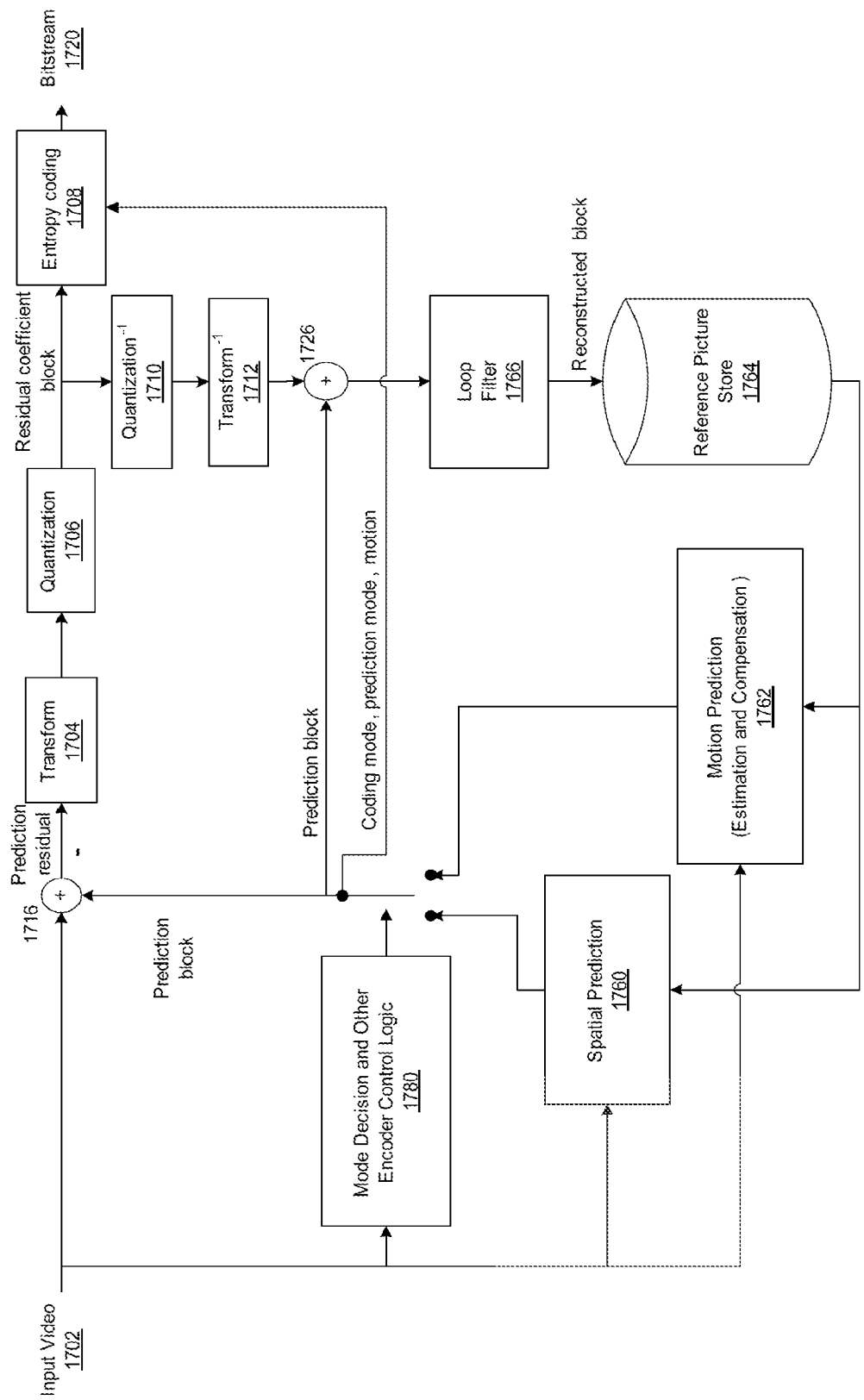
FIG. 17 is a block diagram illustrating an example of a block-based video encoder.

The MPEG-2 TS simple profile 1608 may be a subset of the MPEG-2 TS main profile 1606. It may impose more restrictions on content encoding and multiplexing in order to allow simple implementation of seamless switching. Seamless switching may be achieved by guaranteeing that a media engine conforming to ISO/IEC 13818-1 (MPEG-2 Systems) can play any bitstream generated by concatenation of consecutive segments from any Representation within the same Adaptation Set. The Full profile 1610 may be a superset of the ISO Base media file format main profile 1600 and MPEG-2 TS main profile 1606. FIG. 17 is a block diagram illustrating an example of a block-based video encoder, for example, a hybrid video encoding system. An input video signal 1702 may be processed block by block. The video block unit may include 16×16 pixels. Such a block unit may be referred to as a macroblock (MB). In High Efficiency Video Coding (HEVC), extended block sizes (e.g., which may be referred to as a "coding unit" or CU) may be used to efficiently compress high resolution (e.g., 1080p and beyond) video signals. In HEVC, a CU may be up to 64×64 pixels. A CU may be partitioned into prediction units (PUs), for which separate prediction methods may be applied.

For a input video block (e.g., a MB or a CU), spatial prediction 1760 and/or temporal prediction 1762 may be performed. Spatial prediction (e.g., "intra prediction") may use pixels from already coded neighboring blocks in the same video picture/slice to predict the current video block. Spatial prediction may reduce spatial redundancy inherent in the video signal. Temporal prediction (e.g., "inter prediction" or "motion compensated prediction") may use pixels from already coded video pictures (e.g., which may be referred to as "reference pictures") to predict the current video block. Temporal prediction may reduce temporal redundancy inherent in the video signal. A temporal prediction signal for a video block may be signaled by one or more motion vectors, which may indicate the amount and/or the direction of motion between the current block and its prediction block in the reference picture. If multiple reference pictures are supported (e.g., as may be the case for H.264/AVC and/or HEVC), then for each video block, its reference picture index may be sent additionally. The reference index may be used to identify from which reference picture in the reference picture store 1764 (e.g., which may be referred to as a "decoded picture buffer" or DPB) the temporal prediction signal comes.

After spatial and/or temporal prediction, the mode decision block 1780 in the encoder may select a prediction mode. The prediction block may be subtracted from the current video block 1716. The prediction residual may be transformed 1704 and/or quantized 1706. The quantized residual coefficients may be inverse quantized 1710 and/or inverse transformed 1712 to form the reconstructed residual, which may be added back to the prediction block 1726 to form the reconstructed video block.

In-loop filtering such as, but not limited to a deblocking filter, a Sample Adaptive Offset, and/or Adaptive Loop Filters may be applied 1766 on the reconstructed video block before it is put in the reference picture store 1764 and/or used to code future video blocks. To form the output video bitstream 1720, a coding mode (e.g., inter prediction mode or intra prediction mode), prediction mode information, motion information, and/or quantized residual coefficients may be sent to the entropy coding unit 1708 to be compressed and/or packed to form the bitstream.

Figure 18:
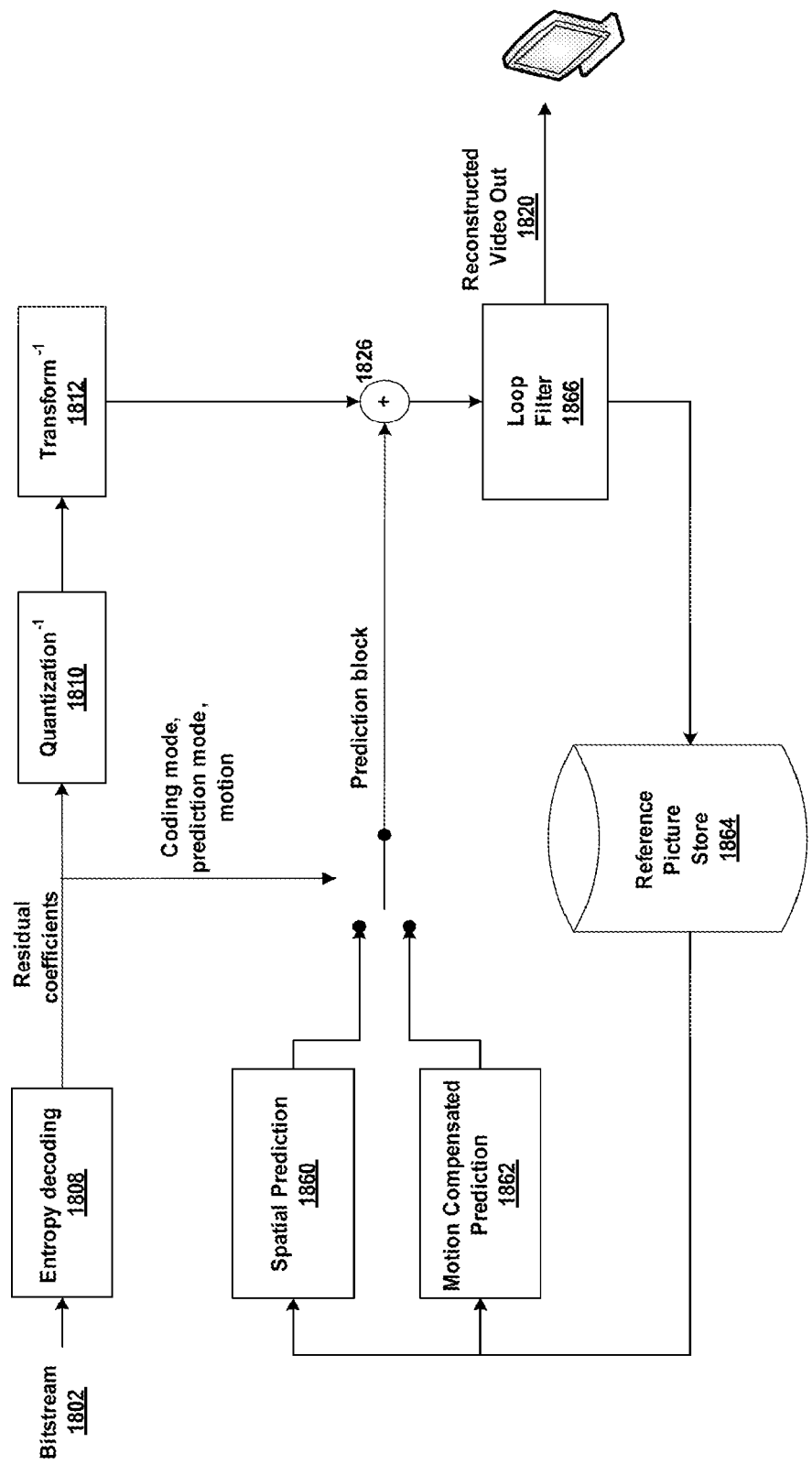
FIG. 18 is a block diagram illustrating an example of a block-based video decoder.

FIG. 18 is a block diagram illustrating an example of a block-based video decoder. A video bitstream 1802 may be unpacked and/or entropy decoded at entropy decoding unit 1808. The coding mode and/or prediction information may be sent to the spatial prediction unit 1860 (e.g., if intra coded) and/or the temporal prediction unit 1862 (e.g., if inter coded) to form the prediction block. If inter coded, the prediction information may comprise prediction block sizes, one or more motion vectors (e.g., which may indicate direction and amount of motion), and/or one or more reference indices (e.g., which may indicate from which reference picture the prediction signal is to be obtained).

Motion compensated prediction may be applied by the temporal prediction unit 1862 to form the temporal prediction block. The residual transform coefficients may be sent to inverse quantization unit 1810 and inverse transform unit 1812 to reconstruct the residual block. The prediction block and the residual block may be added together at 1826. The reconstructed block may go through in-loop filtering before it is stored in reference picture store 1864. The reconstructed video in the reference picture store 1864 may be used to drive a display device and/or used to predict future video blocks.

A single layer video encoder may take a single video sequence input and generate a single compressed bit stream transmitted to the single layer decoder. A video codec may be designed for digital video services (e.g., such as but not limited to sending TV signals over satellite, cable and terrestrial transmission channels). With video centric applications deployed in heterogeneous environments, multi-layer video coding technologies may be developed as an extension of the video coding standards to enable various applications. For example, scalable video coding technologies may be designed to handle more than one video layer where each layer may be decoded to reconstruct a video signal of a particular spatial resolution, temporal resolution, fidelity, and/or view. Any of the concepts described herein may be performed by an encoder and/or decoder, for example, those described with reference to FIG. 17 and FIG. 18. Further, although a single layer encoder and decoder are described with reference to FIG. 17 and FIG. 18, the concepts described herein may utilize a multi-layer encoder and decoder, for example, for multi-layer or scalable coding technologies.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, User Equipment (UE), terminal, base station, RNC, and/or any host computer.

What is claimed:

1. A method performed by a wireless transmit/receive unit (WTRU), the method comprising:
   receiving a manifest file comprising a description of a plurality of segments of media content, wherein each segment represents a time-based portion of the media content, and wherein the manifest file indicates a bitrate and an absolute quality level for each of the plurality of segments;
   selecting a segment of the plurality of segments based on the bitrate and the absolute quality level associated with the segment of the media content;
   sending a request for the segment of the media content; and
   receiving the requested segment of the media content.

2. The method of claim 1, wherein the absolute quality level comprises at least one of peak signal-to-noise ratio (PSNR), structural similarity (SSIM), video quality metric (VQM), visual information fidelity (VIF), J.341, or mean opinion score (MOS).

3. The method of claim 1, wherein the manifest file comprises a media presentation description (MPD) file.

4. The method of claim 1, wherein the manifest file further comprises a description of a plurality of representations of the media content, and wherein each representation comprises at least one segment of the media content.

5. The method of claim 1, wherein the manifest file specifies the same time interval of the media content for each segment of the plurality of segments.

6. The method of claim 1, wherein the segment is selected based on the segment having a lowest bitrate of the plurality of segments that have at least a threshold absolute quality level and that are defined by the manifest file to have the same time interval of the media content.

7. The method of claim 1, wherein the manifest file comprises a segment index file.

8. The method of claim 7, wherein the segment index file comprises at least one of an MP4 file or an M4S file.

9. The method of claim 7, wherein the segment index file comprises an ISOBMFF-based file container comprising at least one box, and wherein a segment quality parameter is included within the at least one box of the ISOBMFF-based file container.

10. The method of claim 1, comprising:
    receiving a presence of the absolute quality level via a flag in the manifest file.

11. A wireless transmit/receive unit (WTRU) comprising:
    a processor configured to:
    receive a manifest file comprising a description of a plurality of segments of media content, wherein each segment represents a time-based portion of the media content, and wherein the manifest file indicates a bitrate and an absolute quality level for each of the plurality of segments;
    select a segment of the plurality of segments based on the bitrate and the absolute quality level associated with the segment of the media content;
    send a request for the segment of the media content; and
    receive the requested segment of the media content.

12. The WTRU of claim 11, wherein the absolute quality level comprises at least one of peak signal-to-noise ratio (PSNR), structural similarity (SSIM), video quality metric (VQM), visual information fidelity (VIF), J.341, or mean opinion score (MOS).

13. The WTRU of claim 11, wherein the manifest file comprises a media presentation description (MPD) file.

14. The WTRU of claim 11, wherein the manifest file further comprises a description of a plurality of representations of the media content, and wherein each representation comprises at least one segment of the media content.

15. The WTRU of claim 11, wherein the manifest file specifies the same time interval of the media content for each segment of the plurality of segments.

16. The WTRU of claim 11, wherein the processor is configured to select the segment based on the segment having a lowest bitrate of the plurality of segments that have at least a threshold absolute quality level and that are defined by the manifest file to have the same time interval of the media content.

17. The WTRU of claim 11, wherein the manifest file comprises a segment index file.

18. The WTRU of claim 17, wherein the segment index file comprises at least one of an MP4 file or an M4S file.

19. The WTRU of claim 17, wherein the segment index file comprises an ISOBMFF-based file container comprising at least one box, and wherein a segment quality parameter is included within the at least one box of the ISOBMFF-based file container.

20. The WTRU of claim 11, wherein the processor is configured to receive a presence of the absolute quality level via a flag in the manifest file.

* * * * *